US010986403B2

(12) United States Patent
Donian et al.

(10) Patent No.: US 10,986,403 B2
(45) Date of Patent: Apr. 20, 2021

(54) INTERACTIVE DIGITAL MEDIA AND ADVERTISING PRESENTATION PLATFORM

(75) Inventors: Philip M. Donian, San Francisco, CA (US); Larry E. Henneman, Jr., Three Rivers, MI (US); Michael M. Malione, Oakland, CA (US)

(73) Assignee: Piranha Media Distribution, Inc., San Francisco, CA (US)

( * ) Notice: Subject to any disclaimer, the term of this patent is extended or adjusted under 35 U.S.C. 154(b) by 958 days.

(21) Appl. No.: 10/606,729

(22) Filed: Jun. 26, 2003

(65) Prior Publication Data
US 2004/0003398 A1 Jan. 1, 2004

Related U.S. Application Data

(60) Provisional application No. 60/393,193, filed on Jun. 27, 2002, provisional application No. 60/392,232, filed on Jun. 27, 2002.

(51) Int. Cl.
*G06Q 30/00* (2012.01)
*H04N 21/442* (2011.01)
(Continued)

(52) U.S. Cl.
CPC ....... *H04N 21/44204* (2013.01); *G06F 21/10* (2013.01); *G06Q 30/02* (2013.01); *H04N 7/17318* (2013.01); *H04N 21/23424* (2013.01); *H04N 21/2541* (2013.01); *H04N 21/25891* (2013.01); *H04N 21/4147* (2013.01); *H04N 21/4312* (2013.01); *H04N 21/4314* (2013.01); *H04N 21/44016* (2013.01); *H04N 21/454* (2013.01); *H04N 21/458* (2013.01); *H04N 21/4532* (2013.01); *H04N 21/4627* (2013.01); *H04N 21/4667* (2013.01); *H04N 21/4788* (2013.01); *H04N 21/47202* (2013.01); *H04N 21/482* (2013.01); *H04N 21/4825* (2013.01);
(Continued)

(58) Field of Classification Search
None
See application file for complete search history.

(56) References Cited

U.S. PATENT DOCUMENTS 5,933,811 A   8/1999  Angles et al. ............... 705/14
5,996,015 A  11/1999  Day et al. .................... 709/226
(Continued)

*Primary Examiner* — Yehdega Retta
(74) *Attorney, Agent, or Firm* — Mintz, Levin, Cohn, Ferris, Glovsky and Popeo, P.C.

(57) ABSTRACT

A system and method for displaying digital media files with compulsory advertisement files is disclosed. In one embodiment, the system includes a user interface, a media file decryptor, an ad manager, an intersplicer, and a media player. The user interface receives input from a user indicating the selection of media files to be presented. The media file decryptor receives and decrypts the selected media files. The ad manager receives and manages ad files from an ad file source. The intersplicer combines the media files with the ad files by providing control signals to the media player, causing the media player to present the ad files with the selected media files. Various embodiments of the invention facilitate the wide distribution of media content in a way that allows the free use of media properties, on demand, with direct consumer exchange capabilities, while at the same time enabling compensation to copyright holders.

23 Claims, 18 Drawing Sheets

(51) Int. Cl.

| | | |
|---|---|---|
| *H04N 21/45* | (2011.01) | |
| *H04N 21/4627* | (2011.01) | |
| *G06F 21/10* | (2013.01) | |
| *H04N 21/44* | (2011.01) | |
| *H04N 21/482* | (2011.01) | |
| *H04N 21/258* | (2011.01) | |
| *H04N 21/254* | (2011.01) | |
| *H04N 21/4147* | (2011.01) | |
| *H04N 21/458* | (2011.01) | |
| *H04N 21/4788* | (2011.01) | |
| *H04N 21/234* | (2011.01) | |
| *H04N 21/81* | (2011.01) | |
| *H04N 21/845* | (2011.01) | |
| *H04N 21/472* | (2011.01) | |
| *H04N 21/8355* | (2011.01) | |
| *G06Q 30/02* | (2012.01) | |
| *H04N 21/431* | (2011.01) | |
| *H04N 7/173* | (2011.01) | |
| *H04N 21/658* | (2011.01) | |
| *H04N 21/466* | (2011.01) | |
| *H04N 21/454* | (2011.01) | |

(52) U.S. Cl.
CPC ....... *H04N 21/6582* (2013.01); *H04N 21/812* (2013.01); *H04N 21/8173* (2013.01); *H04N 21/8193* (2013.01); *H04N 21/8355* (2013.01); *H04N 21/8456* (2013.01)

(56) References Cited

U.S. PATENT DOCUMENTS

| | | | | |
|---|---|---|---|---|
| 6,006,265 | A | 12/1999 | Rangan et al. | 709/226 |
| 6,108,703 | A | 8/2000 | Leighton et al. | 709/226 |
| 6,216,112 | B1 | 4/2001 | Fuller et al. | 705/14 |
| 6,256,554 | B1 | 7/2001 | DiLorenzo | 700/236 |
| 6,317,761 | B1 | 11/2001 | Landsman et al. | 707/513 |
| 6,338,044 | B1* | 1/2002 | Cook et al. | 705/14 |
| 6,381,362 | B1 | 4/2002 | Deshpande et al. | 382/162 |
| 6,389,467 | B1 | 5/2002 | Eyal | 709/223 |
| 6,404,441 | B1 | 6/2002 | Chailleux | 345/704 |
| 6,411,992 | B1 | 6/2002 | Srinivasan et al. | 709/218 |
| 6,434,621 | B1 | 8/2002 | Pezzillo et al. | 709/231 |
| 6,434,622 | B1 | 8/2002 | Monteiro et al. | 709/231 |
| 6,487,721 | B1* | 11/2002 | Safadi | H04N 21/234354 725/36 |
| 6,587,127 | B1* | 7/2003 | Leeke et al. | 715/765 |
| 6,588,015 | B1* | 7/2003 | Eyer et al. | 725/89 |
| 6,611,624 | B1* | 8/2003 | Zhang | H04N 21/23406 370/498 |
| 6,615,039 | B1* | 9/2003 | Eldering | H04N 7/165 348/E7.063 |
| 6,684,249 | B1 | 1/2004 | Frerichs et al. | 709/225 |
| 6,687,737 | B2* | 2/2004 | Landsman et al. | 709/203 |
| 6,950,804 | B2* | 9/2005 | Strietzel | 705/26 |
| 7,263,497 | B1* | 8/2007 | Wiser et al. | 705/26 |
| 7,400,729 | B2* | 7/2008 | Dunstan et al. | 380/239 |
| 7,761,327 | B1* | 7/2010 | Hannah | G06Q 20/206 382/100 |
| 2001/0042249 | A1* | 11/2001 | Knepper et al. | 725/42 |
| 2002/0120564 | A1* | 8/2002 | Strietzel | 705/40 |
| 2002/0138593 | A1* | 9/2002 | Novak et al. | 709/219 |
| 2002/0161739 | A1* | 10/2002 | Oh | G06Q 30/02 |
| 2002/0191950 | A1* | 12/2002 | Wang | H04N 5/783 386/218 |
| 2003/0023973 | A1 | 1/2003 | Monson et al. | 725/34 |
| 2003/0120541 | A1* | 6/2003 | Siann et al. | 705/14 |
| 2004/0215741 | A1* | 10/2004 | Watson | 709/217 |

\* cited by examiner

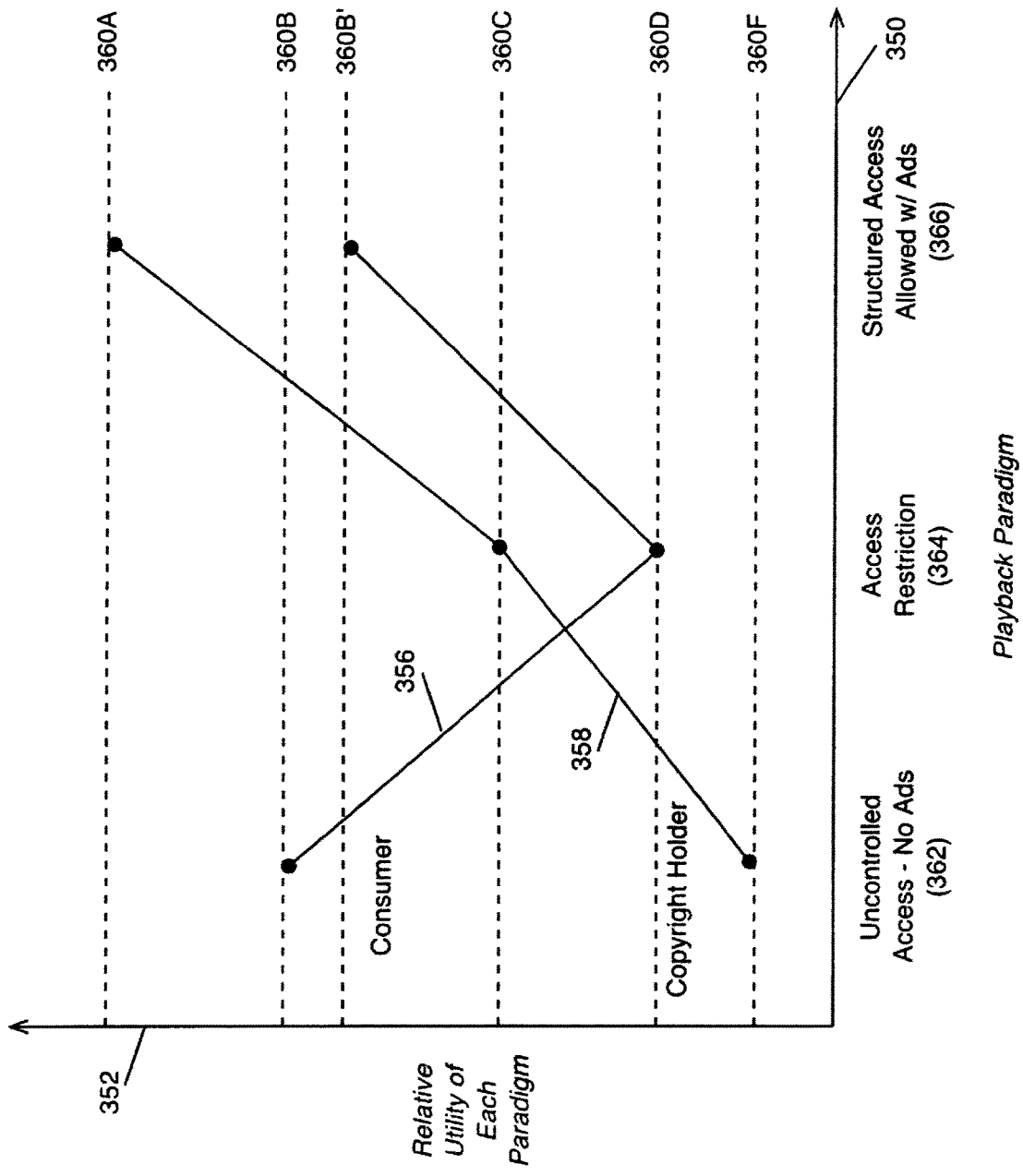

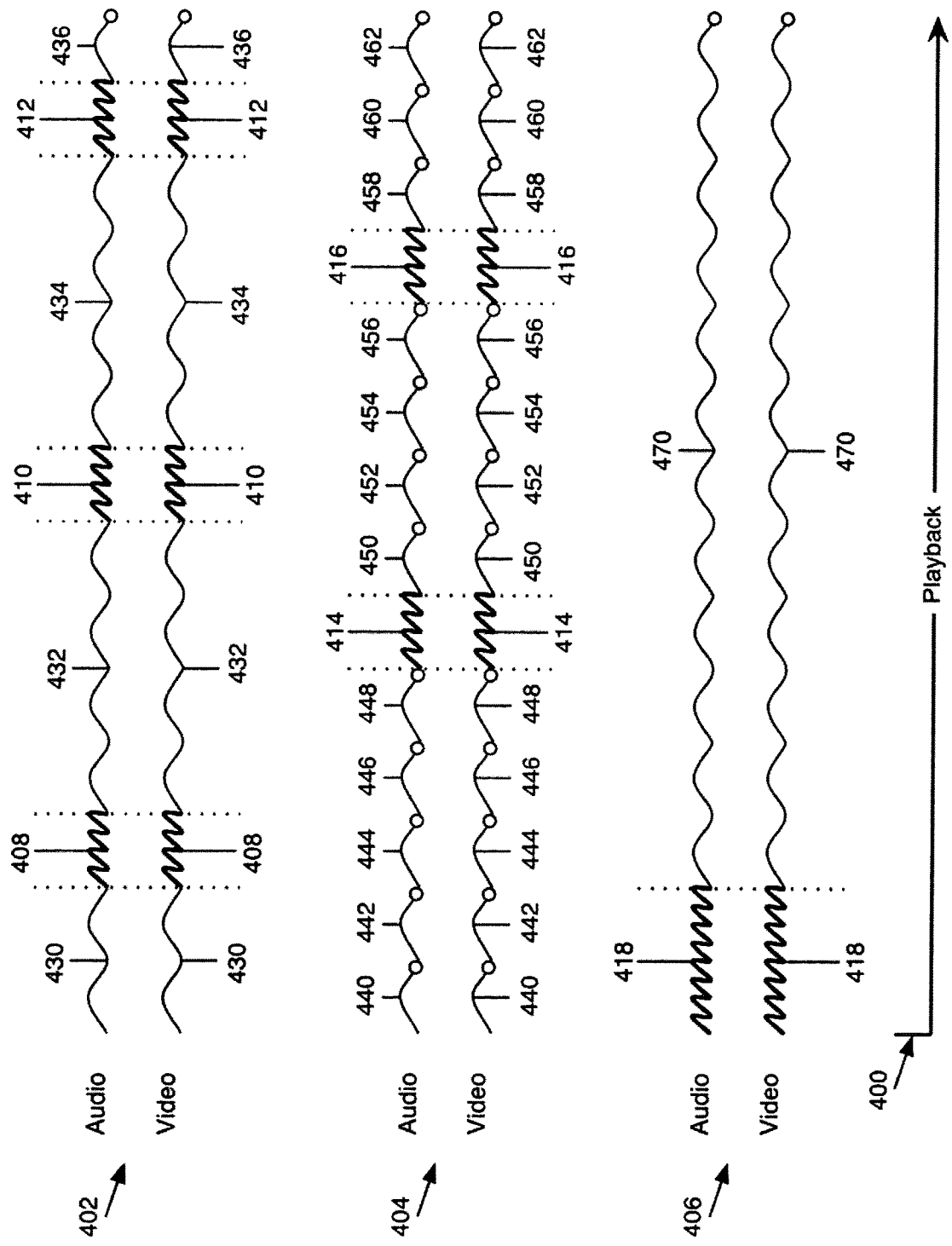

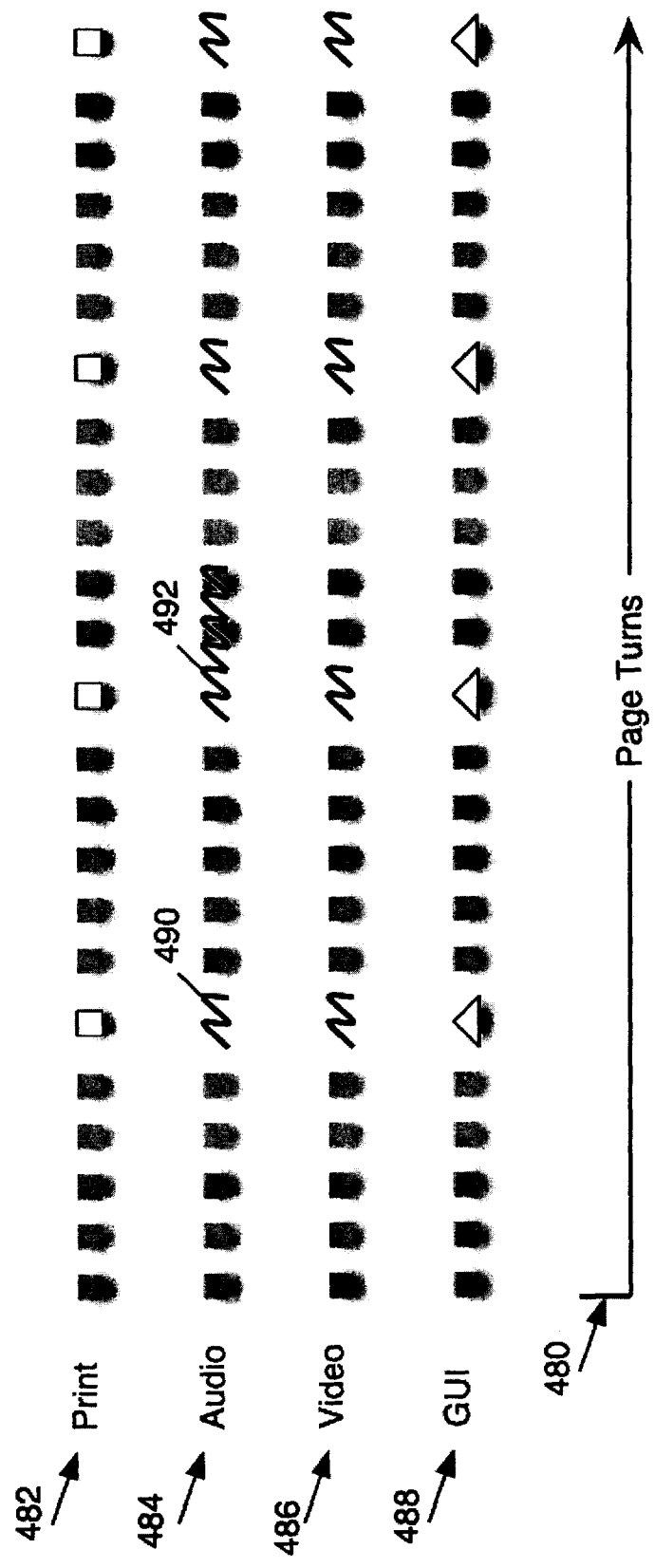

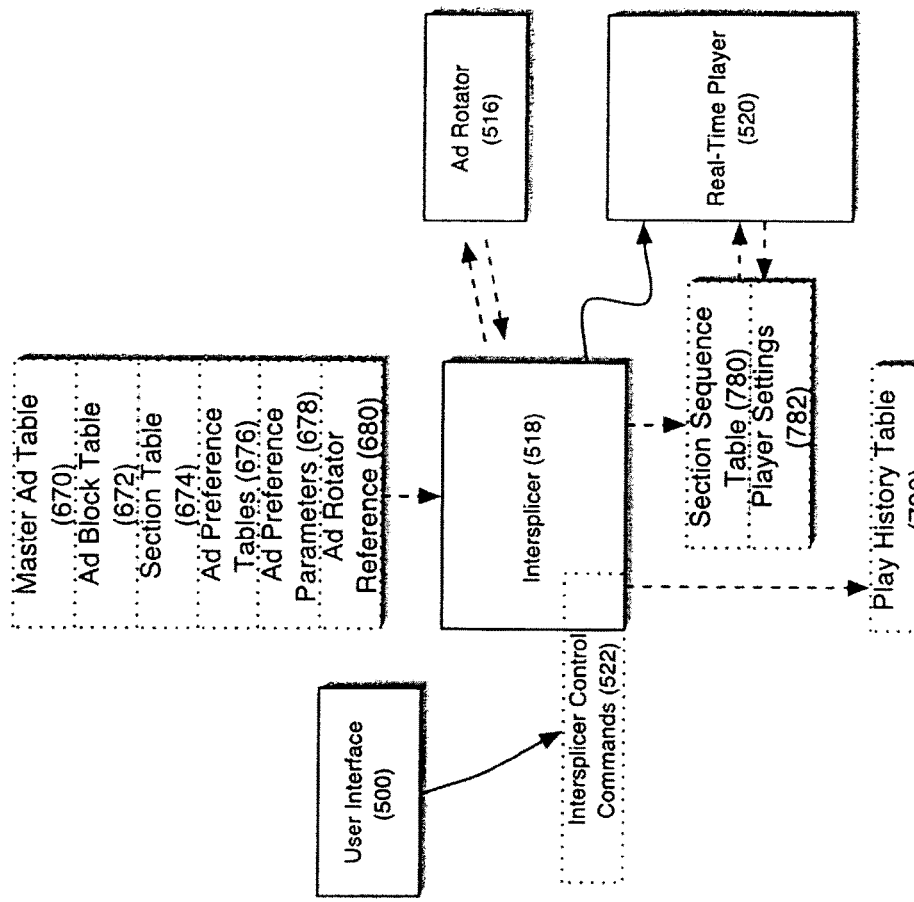
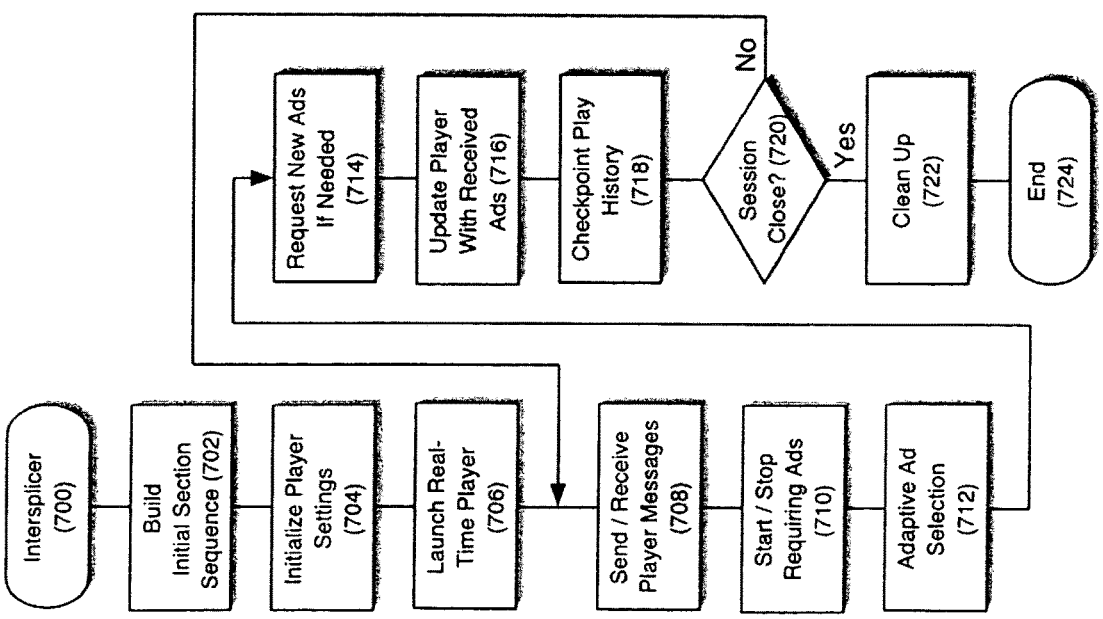
Figure 7B
Figure 7A

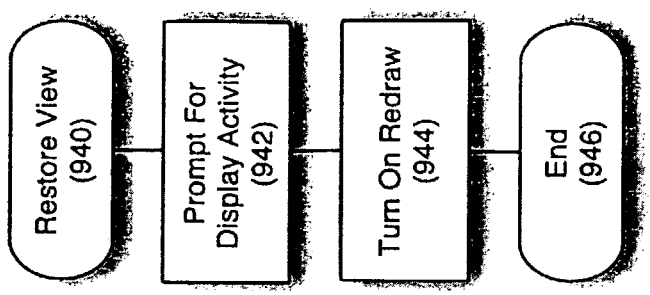
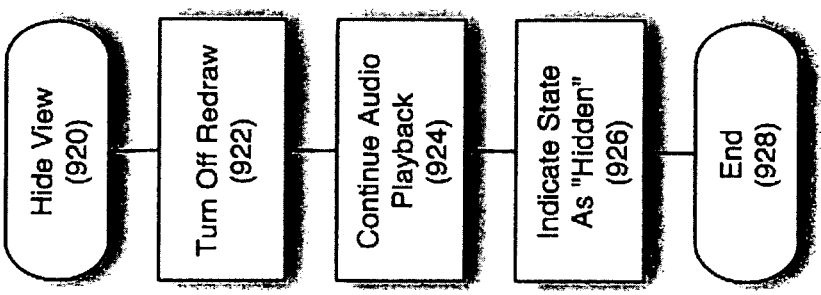
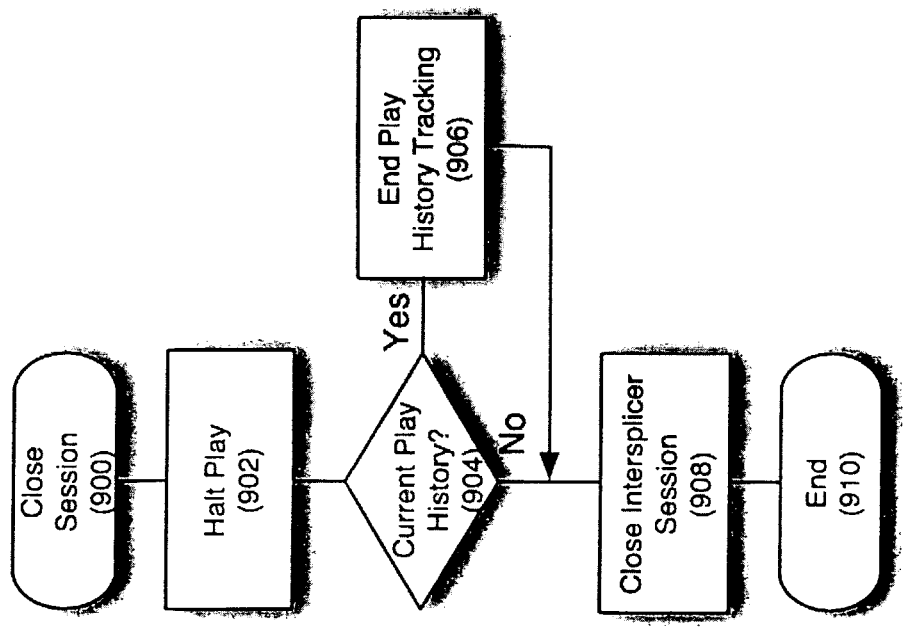

INTERACTIVE DIGITAL MEDIA AND ADVERTISING PRESENTATION PLATFORM

RELATED APPLICATIONS

This application claims the right of priority to U.S. Provisional Application Ser. No. 60/393,193 filed Jun. 27, 2002, and to U.S. Provisional Application Ser. No. 60/392,232 filed Jun. 27, 2002, each having at least one inventor in common herewith, both of which are incorporated herein by reference in their entirety.

BACKGROUND

Field of the Invention

This invention relates generally to the distribution of audio, video, and print media content, copyrighted or otherwise, via digital replication and delivery channels. More particularly, the invention relates to an apparatus and method for the wide digital distribution of media content in a way that allows the free use of media properties, on demand, with direct consumer exchange capabilities, while at the same time offering equitable return to the copyright holder, and providing for a strict level of control over the enforcement of license agreements on the part of the distributor.

Description of Background Art

The problem of widespread consumer-directed copying and redistribution of licensed material has in recent years become a critical concern for the motion picture, television, and recording industries. In light of this issue, publishing and other print media content providers have also had good reason to be apprehensive about digital delivery of their products.

As it stands now, there is much acrimony between the media copyright holders, distributors, and consumers over how to provide the convenience of digital delivery and replication of licensed material, while maintaining adequate control over its use and redistribution. New technologies to restrict consumer copying and unencumbered use of content have met with opposition and a determination on the part of some consumers to defeat them.

The distributor provides digital audio, video, and/or print media content to consumers, while maintaining the rights of copyright holders under a distribution agreement. Consumers desire to have free selection on demand from a wide range of content, and have grown accustomed to exchanging the media content in their possession in order to defeat the pay-for-use policy of the distributor. Given the nature of modern networked digital devices, the consumers' power to redistribute media files illicitly is formidable.

A number of methods for media distribution and licensing have been put into practice throughout the history of mass media. However, as discussed below the conventional methods and apparatus have inherent drawbacks that make it difficult for them to maintain their limitations to consumer access in the presence of modern digital technology and a consumer culture driven to defeat them in open defiance of the rights of copyright holders.

Broadcast Television, Broadcast Radio

Wide distribution of copyrighted material via broadcast television and radio, provided for free to the consumer population, uses the value of advertising promotion to generate revenue for the content creation and delivery system. Media broadcasting employs the practice of mixing licensed content with advertisements and other paid announcements in a pre-configured time sequence, then transmitting this sequence asymmetrically over the airwaves to a large number of consumer receivers capable of showing the content in real-time as it is comes in. By virtue of the advertising sponsorship, broadcasters need not be concerned about the large number of consumers who view the content for free, and in fact, they seek the widest audience they can obtain, knowing that greater viewership leads to greater advertising revenue. Broadcasters benefit when their content is played with the commercials in tact, and they rely on the real-time nature of this distribution method to uphold this condition.

Cable Television, Cable Radio

Wide distribution of copyrighted material to the consuming population via cable television and cable radio is based on the concept of charging a recurring subscription fee, with select services available for a premium, to generate revenue for the content creation and delivery system. Pre-configured analog or digital media content, with or without commercial advertisement, is conveyed asymmetrically to the consuming population via coaxial cable. Cable is run to every home and other cable ready institution, without concern over the large and increasing size of this viewership, provided that all consumer receivers that get their signal from the cable are valid subscription users, and that select services are provided only to those subscribers who have purchased them.

To avert theft of service, cable delivery systems have employed a variety of signal scrambling methods to act as a form of encryption, providing means to decode the signal only to those subscribers who have paid for a particular premium service. Other technologies support the limited use of two-way signals on the coaxial cable, allowing subscriber verification on a receiver by receiver basis.

Satellite TV, Satellite Radio

Wide distribution of copyrighted material to the consuming population via satellite television and satellite radio is based on the same concept as those employed with cable television and radio, replacing the coaxial cable delivery apparatus with a system of orbital satellites and terrestrial receivers. Many of the subscriber verification and service level determination methods from cable have been facilitated in these systems via smart cards and other certification technologies incorporated into the satellite receiving equipment.

Pay-Per-View

Video On Demand (VOD) services based on user at-will consumption of asymmetrical content delivery is in use by cable, satellite, and internet based media delivery systems. Apparatuses to establish two-way communication enable the consuming population to request that content be delivered for a single use or limited time period, at any time upon request, rather than on an infrequent programming schedule of the delivery system. Pay-Per-View VOD allows for the immediate wide area distribution of live or prerecorded individual content without the delays associated with any physical circulation through retail locations.

Transmission Recording Technologies

All of the distribution methods described so far share a common shortcoming, which is that none of them can prevent the consumer from replicating and redistributing copyrighted material to others. Instead, they rely on the inherent limitations of consumer equipment to provide this control.

As consumer audio and video recording and editing equipment has become more commonplace, this lack of direct control has become a serious problem. New advances in technology reduce the time and labor associated with reconstituting broadcast material into a form that is otherwise available only for a fee, and the rise of digital technology has brought near perfect levels of fidelity and ease of reproduction to this equipment. When such devices are networked, the consumer gains the power to reproduce and disseminate copyrighted material at will, and there is little the copyright holders can do to stop or hold people responsible for this practice if it is widespread.

Retail Purchase of Licensed Media

Consumer retail purchase of copyrighted media is enabled by the availability of portable media storage receptacles, ever increasing in quality and capacity. Copyright holders have their content transferred to this portable media for sale in retail locations, through mail order, over the internet, and elsewhere. This method of distribution provides for high revenue generation while limiting explicit theft, however, once the media is removed from the retail environment, the consuming population has at its disposal multiple apparatus—including tape recorders, video cassette recorders, compact disk burners, digital video disk burners, and computer systems capable of reading the media directly, among others—available for the illicit manipulation, replication, and redistribution of purchased media.

Short Term Rental

Limited use of video cassette and digital video disc portable media is based on the ability of the consuming population to enter into rental agreements with licensed distributors through retail, mail order, internet, and other means. A small rental fee is relinquished in exchange for use of the media for a certain predefined time period. If, on expiration of this time allotment, the rented material is not surrendered to the licensed rental distributor, or is never surrendered, late fees may be accessed in an amount equal to or greater than the actual value of the media, in accordance with the terms of the rental agreement. While less costly than purchase of the media at retail locations, if the consuming population desires to re-use any media title, they must re-rent it, incurring additional rental cost and the added inconvenience of another trip to the rental location (or mail order or internet process).

Print Media (Books, Magazines, Newspapers, Other Periodicals)

eBooks and internet based periodicals have extended the physical print medium into the realm of the digital age by enabling the distribution channel to pare down the prerequisite paper volume and inherent bulk of traditional print media, while providing an efficient means of distribution and consumption. Electronic forms of print media require a computer or other digital device to navigate the representation of their print based content.

As it stands today, most newspapers and magazines in digital format bear little resemblance to their physical counterparts. They are commonly conveyed in a live website design which archives old content while sporadically presenting new subject matter. Given the ease with which audio and video media (which generally have much larger data file sizes) may be redistributed once they reach the consumer, publishers have been hesitant to release their content in a more familiar format, through digital means, for fear of widespread redistribution made possible by their diminutive file sizes.

Digital Video Recorder (TiVo, Replay TV, Ultimate TV)

Advances in home entertainment technology have given rise to a new breed of video recording systems based on the commoditization of components usually reserved for computer and other digital media manipulation devices. Digital Video Recorders (DVRs) record broadcast, cable, or satellite transmissions digitally to internal hard drive storage devices. Refinements to the first DVRs include the ability to eliminate commercial advertisements saved during the recording process and to redistribute recorded media from one DVR to another via an open network, such as the internet.

DVRs emulating this peer-to-peer technology provide an efficient means for consumers to redistribute digital media, but without central administration, they lack the necessary controls to prevent widespread redistribution of licensed media content beyond the level of personal use, to DVR users who don't maintain a license to consume the media.

Media Transfer (Burn CD/DVD, Transfer to Mobile Device)

Portability of media has been a hallmark of the technology revolution since the invention of the record album, and is based on the now usual and customary assignment of rights, allowing a consumer to play back, transfer, copy, and otherwise manipulate licensed media for personal use. Significant improvements in portable storage media over the decades have enabled the near perfect reproduction of media content in larger quantity to smaller storage media and other digital devices.

At present, to facilitate the highest possible reproduction standards, analog or digital content may either be 'burned' to Compact Disc or Digital Video Disc storage media, or transferred to digital devices which store the media on physical hard drives or other non-volatile storage apparatus. Once digital media has been transferred to these storage devices, it can be redistributed at will to others with the same ability to manipulate the media, including those who don't possess a license to do so.

Media Sampling

Pre-sales and pre-broadcast content delivery is based on the marketing principle of using promotion to generate sales and/or viewership. Media sampling turns a small section of a copyrighted content property into a revenue-generating advertisement, and redistribution of the sample adds value for the copyright holder. Sampling takes on many forms depending on the nature of the media, and these forms include listening stations in record stores, movie trailers shown prior to the feature presentation or through broadcast means, and television promos for upcoming shows. Given that media sampling in its current form is little more than promotional advertising, it does little to stem the tide of outlaw distribution.

The Internet (Web Sites, Pop-Up Ads, Redirects, Downloads, Subscription)

The rapid spread of networked computing devices has given rise to the Internet, a system for communication based on its ability to facilitate digital communication of thoughts, ideas, tools, art, and other valuable things, in a new and efficient digital manner. To connect, the consuming population generally enters into service agreements with Internet Service Providers who offer the means to get 'on-line' through computer modem dial-up, always-on cable, and other fixed access lines, as well as other wireless means of connection.

With the explosion of the World Wide Web and Email over the last several years, internet savvy consumers have become accustomed to receiving information on-line, much of it for free, as the world community wrestles with how to mature the Web into a tool for business and economy, rather than just for information distribution and collaboration. Efforts to defray the costs associated with keeping free content available on the Internet have included the use of banner advertisements on websites, pop-up advertisements, unwanted redirects to partner websites, voyeuristic monitoring of consumer habits for marketing and other data mining purposes, and the creation of stealth networks which invisibly hijack the computing resources of unsuspecting users.

The prevailing free atmosphere surrounding the internet has encouraged many consumers to redistribute licensed intellectual property, including copyrighted print media, picture content, audio media, video media, and software, with open disregard for the use agreements binding upon them. Subscription services have arisen to offer consumers an alternative to the pervasive means by which free websites maintain their support, but they have done little to alter the consumer sentiment that the power to disregard copyright agreements with impunity gives one the right to do so.

Streaming Media (RealPlayer®, QuickTime®, Microsoft Media Player®)

Analogous to the old style nickelodeon movie projectors, streaming media content over open networked systems (i.e. the internet) provides an asymmetrical means by which media content may be delivered to consumers in a manner that strictly controls its use. A user makes a request for media via client software running on a computer or other networked digital device, and distribution occurs through a local software client that receives and presents said streamed media in its intended form only for as long as the streaming session is active. Though it provides significant copyright holder protection benefits, streaming media does not reside locally with the consumer, impeding the usual and customary right of the consumer to personal use applications such as making copies or recording for review at a later date or time.

Peer to Peer Networks (Napster®, Gnutella®, Morpheus®, Kazaa®, LimeWire®, Etc.)

Present peer to peer file distribution systems are based on advances in networking technologies and concepts which allow for the delivery of digital files directly from one member of the peer community to another without the need for central administration. Individual peer members make a request by way of entering search criteria into a local peer client software application, which then contacts other peers on the network as it searches for files matching the request criteria. Once located, such files are transferred directly from peer to peer. Peer to peer networks provide an efficient apparatus for the distribution of digital media, but without central administration, they lack the necessary controls to prevent the widespread redistribution of licensed media content to unlicensed members of the peer community. Several such systems appear to have been designed with this purpose specifically in mind.

Digital Rights Management

Digital Rights Management, or DRM, is a concept rooted in the notion that content owners may wish to maintain control over the digital distribution of their media. While DRM systems tend to vary in their technology and implementation, in general, they allow owners the ability to grant access to particular encrypted content, allow for authorized redistribution, and provide for transfer to portable media storage receptacles (amongst other assignable privileges) on an item-by-item, user-by-user, or some other basis. While DRM may provide a secure means for content owners to control distribution of their media with approval or denial of access to potential users, it has yet to be implemented in a manner consistent with offering a general license option for free use and redistribution.

Portable Media Access Management

Current "copy-lock" technologies are employed to control the method by which certain portable media storage receptacles such as CD's and DVD's can be used. Through methods which may include placing invisible directories or indiscriminant information at the beginning of the storage receptacles, copy-lock seeks to grant access to the media through some devices while restricting access on others which the copyright holder feels may be used to violate its rights. These methods generally allow for the playback of media content through traditional home entertainment devices while limiting their use in digital reproduction devices such as desktop computer systems. While copy-lock technologies may prove an effective means to curb the ease with which consumers at present may redistribute media through a digital network or media transfer process as outlined above, in their current embodiment they seriously limit the usual and customary rights to personal use and can generally be worked around with the aid of fairly ubiquitous analog technology—commonly referred to as the "analog hole."

To the inventor's knowledge, there is currently no conventional digital media distribution method in practice that incorporates the free consumer-directed access and exchange of content with the distributor-directed control of media sequencing after all such exchanges.

SUMMARY

It is an object of the present invention to provide a revenue generating market for the free consumer redistribution of media content, sponsored through paid advertising that a consumer may be required to experience during the course of media playback, provided by means of a system and/or method that offers the benefits of content restriction and controlled playback, working in conjunction with customized, addressable advertising on an individual consumer basis, with monitoring of content use and ad penetration to track audience viewership.

In accordance with the above objects and those that will be mentioned and will become apparent below, one particular embodiment of the digital media distribution method and apparatus in accordance with this invention comprises an interconnected network of computer systems and other digital devices, for use by a multitude of human consumers who access and use media content by way of these networked devices, a distributor who releases media content to consumers over the network, and a software application that imposes limitations on the consumer's use of media content.

The application software functions primarily as a media presentation "player/viewer", capable of running audio, video, and print media content. There is the provision for compatible versions of the player/viewer software to run on most consumer digital device and computer systems. The player/viewer software applies digital rights management techniques to control consumer use of media in a novel way. The player/viewer allows for a "general license", whereby a consumer can obtain free use of a media property, with strict controls enforced during media playback.

These enforced controls amount to the intermittent insertion of paid commercial advertisements and other promotional material into the time sequence of the media content during its course of presentation, along with the temporary disabling of certain user controls to ensure that this material is presented in its entirety. The consumer gains free use of content in exchange for exposure to these paid advertisements.

Some of the forms these advertisements may take are novel in the realm of digital advertising over open networks. Advertisements may occur in the same media style as the content. That is, in addition to any software-controlled advertising methods in ordinary practice on consumer digital devices, audio ads are inserted into audio content as they have traditionally been heard in radio broadcasts, video ads are spliced into video content as they have traditionally been seen in television broadcasts, and print ads are interspersed with print content as they have traditionally appeared in newspapers and magazines. In addition, for book and other print content, there may be, according to the invention, audio ads played at certain intervals, similar to those traditionally heard over the radio.

Rather than strictly granting or denying access to secured content, one particular method of the invention provides for unlimited redistribution and free use under general license, enforced by the player/viewer software. This is a new use of digital rights management practices, and it provides improved security by diminishing incentive on the part of the consumer to breach the system, since the desired content is already available free-of-charge from within it.

The player/viewer software has the means to assemble a new, customized sequence of requested content, interspliced with promotional material every time it runs, selecting appropriate ads on demand from a greater repository. Ads are selected on the basis of requested content and other specific information that the system maintains about consumers and their media/ad play histories, and new ads may be chosen even when reusing the same content.

Where demographic, geographic, or other relevant user and/or system information is available, the player/viewer software can apply targeted marketing in the ad selection process. Targeted marketing takes the form of addressable advertising, which not only identifies a select advertising candidate list, but additionally verifies that individual ads were received and consumed by the intended recipient. This custom-selection of advertisements, addressable to unique users, conducted by software running on the consumer's device, is a novel use of new and existing technologies.

In the course of playing or viewing media content, the application software automatically edits the selected advertisements into the presentation stream. The novel "intersplicer" module providing this functionality enforces the conveyance of required ads in their entirety at least once, by disabling certain user playback controls while the ads are running. This module also has the power to adaptively select and re-sequence the ads to be shown in response to the user's navigational actions throughout the content, and keeps a history of all the content and advertising material that is presented.

After monitoring content use and ad penetration in the course of running media, the software provides a usage monitor that compiles this data after a play/view session is finished, possibly reporting it back to the distributor. Where such reporting occurs, this functionality gives the distributor the power to measure audience viewership of media content and advertisement penetration, provide for ad rotation, and generate valuable ad usage statistics. For media, the data records provide a detailed profile indicating the number of repeated times that each part of the content is consumed. This novel improvement allows the distribution system to derive greater value from media that is redistributed to a wide audience, through better knowledge of viewership patterns on an item by item basis.

The player/viewer software may employ a distributor-controlled licensing database, allowing the system to track a variety of service types by which a particular user could license a particular media property. Such a database also gives the distributor complete control over the system, providing the player/viewer the ability to grant or deny service altogether, depending on the property and/or the user. In this way, the present invention endows the distributor with the complete power to limit consumer use as directed by the copyright holder, on a property by property basis, and to adjust the amount of required advertising as needed. Local mirrors of this database on consumer-accessible devices are secured via digital rights management, so that the consumer cannot access them outside the running player/viewer software.

The software may also make use of a distributed media catalog for the purpose of locating particular media content throughout the distributor's system, and a hybrid central server and peer-to-peer media transfer system, by which secured media files are delivered to a consumer system upon request. When a centrally administered database for digital rights management is employed in conjunction with peer-to-peer file exchange of secured media content, in a distribution system that provides multiple service levels and types, including a general license to allow free viewing with ads, carried out by player/viewer application software running on the consumer device, there is a new and improved use of these technologies.

Through this software apparatus running on individual consumer systems, the present invention functions as a new use of the traditional broadcasting business model, which acts as an improvement by adding value to freely exchanged copies of media, distributed over a digital network. By coupling the long-standing broadcast media practice of commercial advertisement sponsorship with the appeal of select, on-demand, consumer-level redistribution over a digital network, the consumer gets the conveniences of virtually unlimited free media selection, instant access, and unrestricted sharing, while the copyright holder gains a tangible value from the increased viewership that results, through an apparatus that makes it possible to maintain explicit control over media use throughout.

The consumer is free to select and program any desired sequence of content, and the player/viewer software has the ability to present this material with ads inserted, while it monitors and measures all use of media and ad content, including repeated use of the same material. Through its use of paid advertising and sophisticated audience monitoring, the invention improves on current digital media distribution practices by creating an advertising-based market for unlimited free consumer use and exchange of media content over a digital network. The content use restrictions resulting from this distribution method and apparatus are an improvement over currently practiced methods, in that they benefit both consumers and copyright holders.

BRIEF DESCRIPTION OF THE DRAWINGS

Further features and advantages will become apparent from the following and more particular description of particular embodiments of the invention, as illustrated in the accompanying drawings, wherein like referenced characters generally refer to the same or similar parts or elements throughout the views, and in which:

FIG. 3B illustrates an economic value comparison of existing digital media distribution practices against one particular method and apparatus of the invention;

FIG. 4A is a schematic diagram illustrating the sequence of play for common audio/video media use sessions, according to one embodiment of the invention;

FIG. 4B is a schematic diagram illustrating the sequence of viewing for a typical print media use session, according to one embodiment of the invention;

FIG. 7A is a flowchart illustrating one particular method for performing the intersplicing operation of FIG. 5A, according to one embodiment of the invention;

FIG. 7B is a block diagram illustrating in more detail the flow of data between certain software components operating in FIG. 7A, according to one embodiment of the invention;

FIGS. 9A-9C are flowchart illustrations of software operation in response to user-generated display control events during playback, according to one embodiment of the invention;

DETAILED DESCRIPTION

Figure 1:
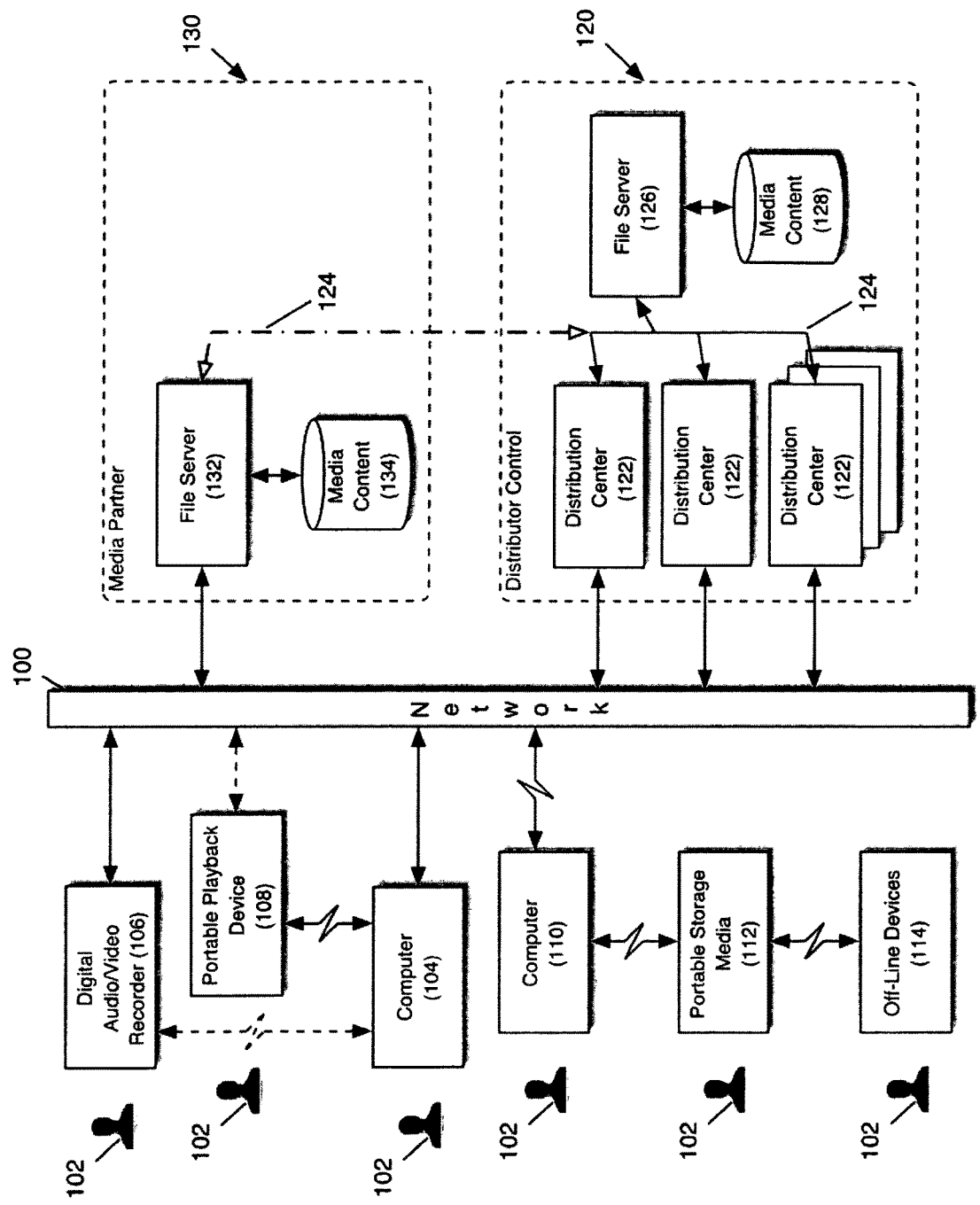
FIG. 1 illustrates a networked computer system for the wide distribution of digital media content, according to one embodiment of the invention.

Referring now to FIG. 1, there is shown a diagram of a networked computer system for the wide distribution of digital media content over at least one public or private telecommunications network 100, such as the Internet. The system supports both client-server and peer-to-peer network communication architecture models, as well as any other networking methodology that can operate according to the invention.

A multitude of consumers 102 use their individual computer systems 104 and 110 or other digital device systems 106, 108, and 114 to play and view a variety of media content. Any consumer-used computer device 110, digital device 114, or storage medium device 112 that is capable of a temporary or ongoing digital transfer connection to any of the networked systems 104, 106, 108, and 110, either directly or indirectly, is also to be considered as part of network 100 if the device ever stores or runs any media that is an original or copy of content distributed by way of the present invention.

For instance, at a time when computer 110 is connected to network 100, consumer 102 may via the method of the invention obtain media that is then stored on the hard drive of computer 110, in order to use it at a later time when the connection is not available. If this media data is copied to or used with device 114 via removable storage medium 112, then device 114 is to be considered as part of network 100 according to the invention.

A distributor 120, shown in the figure as a box, is a person or business entity employing or participating in the method of the invention to release digital media content titles and tracks to consumers 102. A "title" refers to an individual stock keeping unit, as managed by the distributor. A "track" is a self-contained portion of a title that a consumer may specifically order separately.

Titles and tracks are media content, occurring in any combination of video, audio, and print forms, or any other media format now known or later developed. Video refers to any media that consists of moving pictures, with or without sound, in a page-free context, including, without limitation, a film, television show, documentary, short subject, or music video. When audio accompanies video, the content is still classified as video. Audio refers to any media that contains audio only, in a page-free context, including, without limitation, a short musical track, such as a rock or popular song, a long musical piece such as a symphony or rave music track, or an audio program, such as a lecture, speech, radio drama, or book on tape.

Print media forms include any static or software-driven content that employs text and/or images laid out into pages, including, without limitation, a newspaper, magazine, book, reference material, or user-interactive hypermedia document. Print media may contain audio and/or video material, but if the primary value of the content involves page layout, it is classified as print media. However, when page-based operations take place within a single video area, and are subsidiary in value to accompanying video content, the media is video. For instance, the page-based menus on a DVD count as part of video media content, even though they involve text, menus, and pages.

Any audio, video, or print media content may also include extra application software code and/or document data as a part of it. Such code/data provides the player/viewer with specific logic functionality to accompany the content. The menus and text that accompany DVD format movies are a prime example of this kind of code/data.

Distributor systems 122, 126 are those computers and devices on network 100 that are secured under strict control of the distributor 120. Apart from these distributor systems, there may be a very large number of "consumer systems"—a term to denote any computer or other digital device under unrestricted consumer control and having either direct or indirect access to the network 100. Such a consumer system may be, among other things, a computer system, a digital audio/video recorder, a portable playback device such as a palm-top computer or MP3 player, or a removable storage media device such as a computer with a read/write CD/DVD drive or a standalone CD/DVD player.

Distributor systems 122 act as media distribution centers, using a software firewall or other means to secure them from unauthorized consumer access, and allowing consumer systems to interact with them for the purpose of exchanging media and/or data according to the invention. Distributor systems 122 may be interconnected on an isolated or otherwise secure extended network 124, or possibly through a software-secured layer on open network 100. The media distribution centers 122 coordinate their activities and maintain consistent databases via network 124.

Also on the distributor's network 124 is a file server 126, which handles the transfer of media content 128 to the media distribution centers 122 as needed. Though not shown, different distribution centers 122 may be connected to different open distribution networks, to facilitate distribution over multiple networks. Also, a number of media provider organizations 130 doing business with the distributor may facilitate the transfer of media content 134 to either consumer systems 104, 110 or distribution centers 122 via one or more of their file servers 132, which may either act through the open network 100, or be connected to the distributor's network 124.

The distributor is free to employ any database and file server design to suit the needs of the distribution network, provided it operates in compliance with the invention. For instance, the design might involve a secured, distributed database, administered to maintain a catalog of all media titles, the service types offered for each title, user profile and billing information, user demographic information, user/software registration data, user/title licensing data, security keys, a catalog of advertisements, user/ad viewership history, title/audience viewership history, and other statistics. Alternatively, a minimal database might maintain nothing more than a catalog of titles and advertisements, providing distributor 120 with a much lower amount of control over the system.

Acting as a server, each distribution center 122 may operate with any number of consumer-use computer systems 104, 110 or web-enabled devices 106, 108 over the network 100. It is also possible, according to the invention, for consumer systems 104, 110 and devices 106, 108 to exchange media over shared network 100 on a peer-to-peer basis. For instance, when it has network access, consumer system 110 may direct another consumer system 104 to deliver particular media content to it. Media files exchanged in this way are secured from the consumer through digital rights management practices.

In the peer-to-peer context, a consumer system may act as either a client or a server. In the previous example, computer 110 acts as a client when requesting the media from computer 104, which acts as a server to handle the request. If peer-to-peer functionality is indicated, the player/viewer software described below includes peer-to-peer server control logic, which it may run or launch as a background maintenance task or process, or alternatively have the system launch automatically from time to time by modifying the system's startup or operating environment.

In one embodiment, the invention employs a distributed database, operating as a centrally administered digital rights management server on one or more media distribution centers 122, working in conjunction with an open peer-to-peer distribution system of secured media content, in a manner that offers the licensing of possibly multiple service types, while including at least one service type intended to allow widespread free viewing of distributed content on the part of the consumer, while still upholding value of use for the media copyright-holder. Under this scenario, the peer-to-peer functionality may be transparent to the consumer. In particular, when computer 110 requests media from distributor systems 122, distributor 120 may instruct computer 104 to act as a server to handle some part, or all of the delivery of the media request in place of distributor systems 122, giving the appearance that the media request is being fulfilled by the distributor. When database management, file exchange, and digital rights management technologies are used together in this novel way, in conjunction with the application software described below, there is a new and improved use of these technologies.

To achieve this improvement, the apparatus and method of the invention employ a new use of a traditional business model on a client-by-client basis over a digital network, through the use of novel media player/viewer software running on individual consumer systems to act as an apparatus for carrying out this model, as embodied in the parts of the software described in detail herein.

Figure 2:
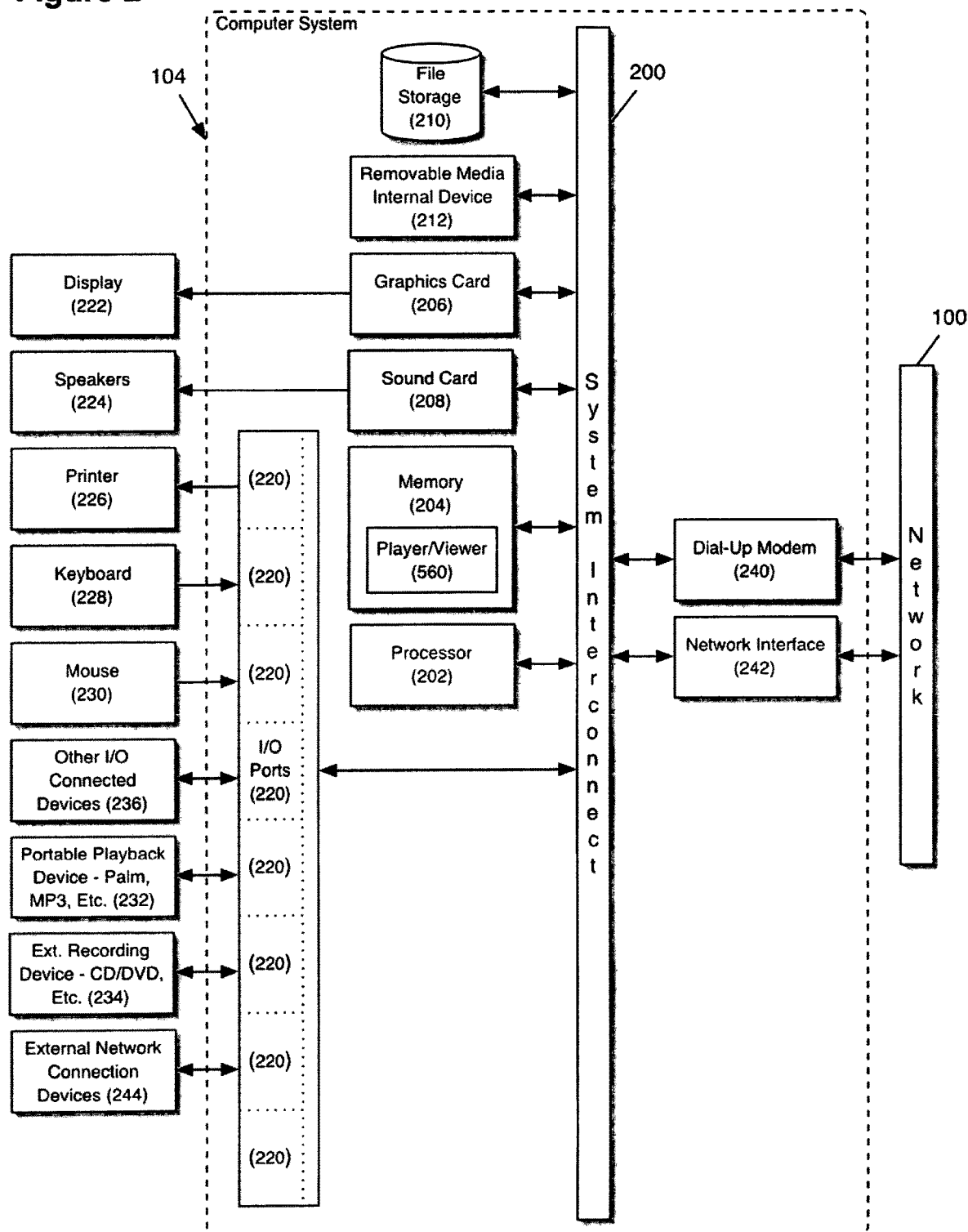
FIG. 2 illustrates a consumer computer system, according to one embodiment of the invention.

Referring now to FIG. 2, there is shown a more detailed diagram view of a representative consumer computer system 104 (FIG. 1), to illustrate some of the hardware components which, when controlled by the method implemented in the novel player/viewer application software, comprise one aspect of the invention. The distribution network and method described in FIG. 1 work in conjunction with the software application described below, which operates on ordinary consumer computer and other digital device systems, such as the one described here.

Computer system 104 has a conventional architecture, which includes a processor 202 and volatile RAM memory 204 coupled to processor 202 through an interconnect 200. Memory block 204 includes an ad-intersplicing player/viewer 560. While player/viewer 560 is shown as a complete functional block within memory 204, it should be understood that player/viewer 560 includes stored code (e.g., on file storage 210), portions of which may be transferred into and out of RAM memory 204 as needed. Interconnect 200 may be a system bus or any other apparatus that is employed to connect components such as these in a consumer-grade computer system.

Also coupled to interconnect 200 are internal peripheral hardware devices, such as file storage 210, which may be a hard drive or other persistent storage peripheral, and removable media internal device 212, which may be a floppy drive, ZIP drive, CD-ROM or DVD drive, CD/DVD read/write drive, or any other removable media drive.

Internal peripheral devices connected to interconnect 200 also include those for the generation of physical sounds, such as sound card 208 and speakers 224, those for the real-time display of graphics, such as graphics card 206 and computer display 222, and those to communicate over networks, such as network interface adapter 242 and dial-up modem 240.

Interconnect 200 also serves a number of common I/O ports 220, including those for keyboard 228, mouse 230, other connected I/O devices 236, printer 226 for persistent output, and any external I/O ports 220 that are available to connect system 104 to other, external peripheral devices, such as portable playback device 232, external recording device 234, or external network connection device 244. External recording device 234 may be, among other things, a CD player/burner or a DVD player/burner.

Computer display 222 is any type of volatile computer display device including without limitation a cathode ray tube (CRT), a light-emitting diode (LED) display, or a liquid crystal display (LCD). The other connected user I/O devices 236 may include any type of user input or output devices including, without limitation, a numeric keypad, a pointing device such as a trackball, light-pen, touch-sensitive pad, digitizing tablet, thumb wheels, or joystick, or a nonstandard display device or printer.

Network interface circuitry 242 couples computer system 104 to open computer network 100 (FIG. 1). Where high-bandwidth network service is absent, modem circuitry 240 allows the system to connect to network 100 by dial-up over ordinary telephone lines. It is also possible to connect to network 100 through alternative means by way of an external network connection device 244, which connects to network 100 directly and transfers network data to system 104 by way of an I/O port 220.

The invention applies to these and any other hardware components that may be employed in a consumer-grade computer system or other digital device to carry out the ends of the media player/viewer software described herein, whether or not they resemble or perform the same specific functions as those components shown in FIG. 2.

The Player/Viewer Application Software

Media titles and tracks that the distributor 120 (FIG. 1) releases, either by streaming broadcast delivery or by copy on demand, over digital network 100 (FIG. 1) are to be seen and heard primarily through the use of program software applying the method set forth herein, on consumer media device systems supporting the use of such software. Different device/computer hardware platforms and operating systems, including embedded devices, may require custom versions of the software, and each such version is to carry out the method of this invention to the best of all practical ability within the constraints of its operating environment.

This software generally provides the functionality to run audio, video, and print media, as defined above, to the extent that the specific device on which it is running supports each of these media forms. On platforms that support graphical user interfaces and multitasking or multithreading, the software is implemented as a full-fledged "media player/viewer", offering multiple panels and/or windows to switch between any number of user-initiated media presentations.

Figure 3A:
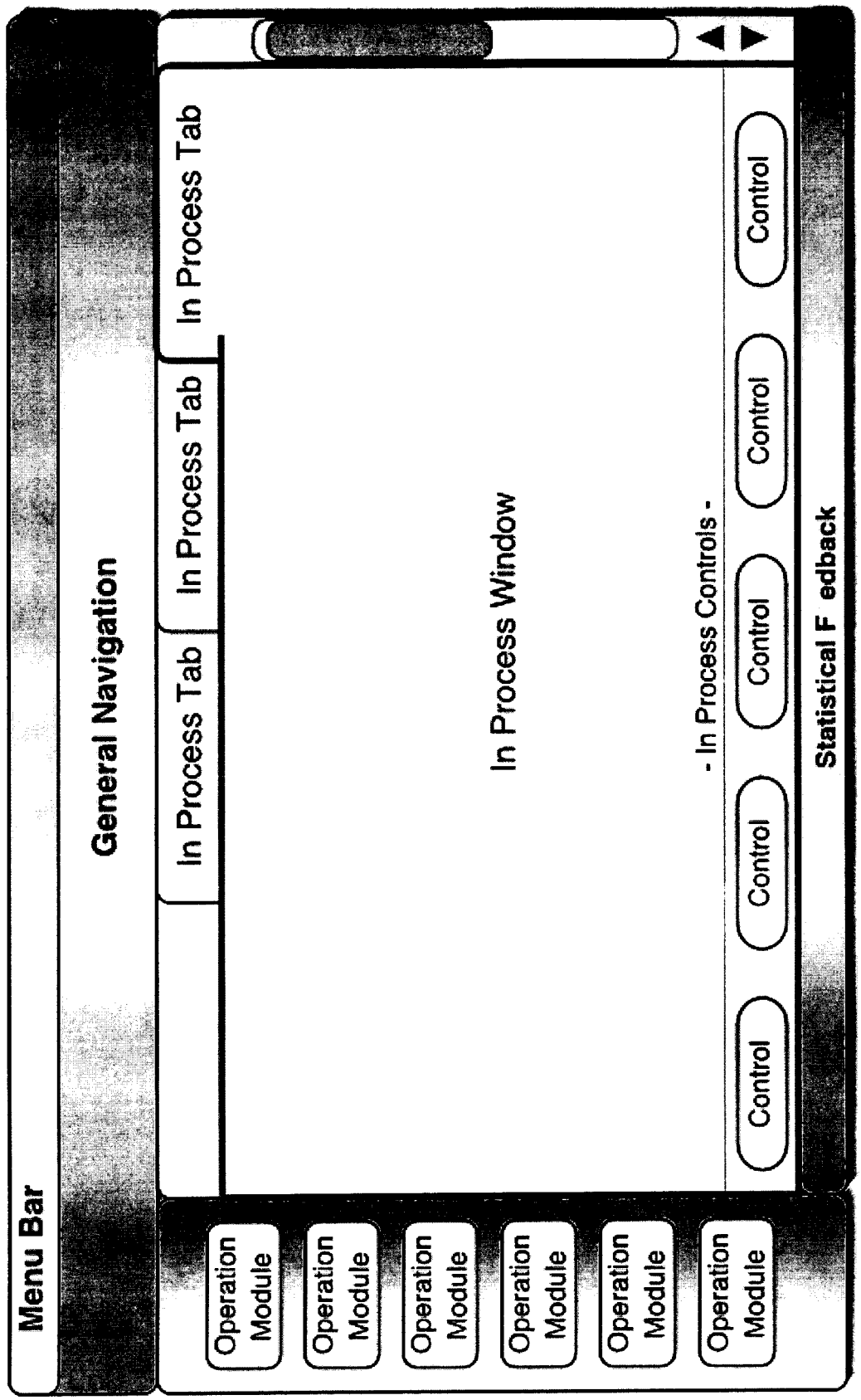
FIG. 3A illustrates the player/viewer software graphical user interface, according to one embodiment of the invention.

Referring now to FIG. 3A, there is shown a diagram of the player/viewer software's graphical user interface, as it might appear on computer system 104 (FIGS. 1 & 2). It provides the ordinary functionality commonly found in typical media player software applications, and the software design methodology behind its implementation, delivery, and installation may be ordinary or new, as long as they result in software that behaves as specified in this description. For sake of further discussion, the term "user" will be taken to be synonymous with consumer 102, from this point forward.

Installation of the software on computer system 104 (FIG. 2) or any other consumer device system stores the player/viewer program code appropriate to the specific system somewhere on its persistent file storage 210, or possibly in read-only memory (ROM) depending on the device. Installation may also modify the operating system to launch maintenance and server programs as background processes, either at startup or at some other specified time interval. Consumers 102 may carry out the installation process on their own systems, while other systems may ship with the software pre-installed as they are manufactured.

The player/viewer's user interface (FIG. 3A) takes direction from a consumer by appearing on the consumer's display device 222 and giving audio and/or visual feedback to the input actions of its user. The functional style in which this player/viewer appears to the user may follow ordinary practice in the design of such interfaces, or it may involve a different and possibly new look and feel, as shown in the figure.

Such a player/viewer may also offer functionality through panels and/or windows for any of a wide variety of other conventional services, including without limitation internet browsing, internet chat, networked video gaming and tournaments, video conferencing, content aggregation, office productivity, email, secure business document distribution, and special interfaces for online auctions, event schedules, and ticket purchasing for movies, concerts, operas, ballets, sporting, and other events. Additionally, the player/viewer may provide integrated control over other ordinary network procedures, such as exchanging media content between users, ordering media and services from the distributor, and viewing system broadcast messages.

As it runs, the player/viewer software conveys video, visual effects to accompany audio, and print-based media content in an operating area of display 222. There also are one or more control areas through which a consumer 102 may take specific actions pertinent to the associated media presentation. The consumer hears audio media content as sound emanating from the system speakers 224, and sees video and print media content on the computer display 222, either in conjunction with audio or not.

According to the invention, to prevent unlicensed consumer use of media content, persistent copies of media titles and tracks are retained as encrypted data on consumer devices. The player/viewer software uses a digital rights management approach to conceal the algorithm or key for removal of this encryption from the consumer. By way of this approach, the information for encryption removal is granted only to media player/viewer software that complies with the present invention in maintaining restriction and control over media use, while enforcing digital rights management on its secured data.

Novelty arises in the player/viewer software's particular ability to control use of media content while providing the means for unlimited free viewing of requested media, through a general licensing process that is transparent to the user. Unlike conventional digital rights management enforcing software, which primarily offer the choices of either granting or refusing access to particular material, the player/viewer software of the present invention can allow for unlimited free viewing of content, while still preserving the value of such use, by implementing the methods of traditional broadcast media business practices as a new use with digital media distribution, carried out by a software apparatus, the player/viewer present on each consumer system.

Along these lines, according to the invention, the player/viewer has logic to allow consumer 102 the free and unlimited use of secured media content, by offering a free general license for use of the content with paid commercial advertisements and other promotional material inserted into the content stream at certain intervals. The player/viewer may also have the power to select which ads are best suited for a particular consumer 102 given information the distributor 120 maintains in its central database about each consumer, applied in conjunction with each specific media title or track request.

No matter how it selects the ads, the invention provides a means to sequence these ads into appropriate blocks that are initially chosen and scheduled into the content stream by a novel "advertisement manager" module of the player/viewer software. There is a novel "intersplicer" module in the player viewer software that launches, communicates with, and strictly controls a digital rights management enabled real-time player module, while the player module handles the actual playback and viewing of the media content through the player/viewer software.

In this way, the invention has the ability to strictly enforce the insertion of advertisements into the content stream. Furthermore, whenever the player/viewer is running any ads, it has the power to ensure that the consumer 102 using it will experience the advertisements in their entirety. In this particular embodiment of the invention, the player/viewer accomplishes this end by disabling any user interface command that the consumer could possibly use to skip, back out of, or speed through the promotional material, including the ability to lower the sound volume beneath a pre-determined threshold level. The intersplicer also has the ability to adaptively regroup and re-sequence the insertion of ad blocks extemporaneously (i.e. "on the fly"), in response to the consumer's arbitrary direction of the playback within the requested content, by means of playback controls.

By enforcing the insertion and conveyance of promotional material into media titles and tracks that the distributor 120 releases openly and freely, without charging the consumer 102 a fee to run it in this manner, the invention preserves the value of content use to the copyright holder while making it widely available on demand to the consuming public.

Essential to safeguarding the digital rights management measures that the player/viewer employs is the lack of a ready means to save media content to persistent storage in a format ordinary media player software can directly use. However, in certain instances the invention does allow for the use of such media content outside of the player/viewer.

Distributor 120 is free to permit this kind of use on a case by case basis. In this event, the distributor ensures that some mechanism exists to satisfactorily prevent unlimited copying and redistribution of the media outside of the player/viewer, unless the content in question is available for free release. Other software applications may also be permitted such use if they strictly adhere to solid digital rights management practices in securing the same data and content as the player/viewer of this invention, and provided the distributor deems acceptable their use of the media content.

Additionally, the player/viewer may provide for outside use of content by supporting its export onto removable media intended for hardware devices that have little capacity to generate reproductions, such as standalone CD and DVD players found in home entertainment systems. Through such a provision, a consumer 102 using the player/viewer has the power to use network distributed content on ordinary audio/video equipment, for instance, by burning a CD or DVD for use with such a device.

However, in this event the player/viewer typically employs some form of "digital copy-lock" technology on the removable media, to prevent any widespread redistribution outside the method of the present invention. This copy-lock technology flags the physical storage medium in such a way that a consumer may use it on a standalone device, but when inserted into a computer or other digital reproduction ready device, it will not function except through a running instance of the player/viewer software of the invention, if at all.

Direct export may also occur by transfer to other digital devices, such as mobile audio MP3 players. Ideally, such devices would employ digital rights management and other measures similar to those just described, to prevent redistribution of content exported in this way.

The player/viewer may also provide for the direct import of content from a number of conventional media formats, if the distributor 120 chooses to accommodate such a service. With direct import, any consumer 102 may transfer raw content already in their possession to player/viewer media for local storage, or may choose to circulate this content through the distribution system. The process begins with the player/viewer requesting information necessary for initial screening from the user. It then adds a player/viewer format encrypted copy to the user's system, prompts the user to keep or delete the original media file (if the option exists to do so), and optionally takes action to identify media titles and tracks through an automated process, making the results available to the user for application to the imported media. Initially, the new local copy is tagged as banned for redistribution, granting access only to the user who imported it. If the content is to be circulated through the system, the player/viewer may send a copy of the content to a media distribution center 122 for more detailed scanning and review necessary to prepare it for distribution.

If imported content matches an already-existing title or track, the player/viewer gives the user a choice to replace the import with an official copy, bring it into the system for distribution as a new title or track in the event that it differs from the original in some artistic or other valid way, or use it as is without replacement. If the user elects to use it as is, the copy maintains its status as banned for redistribution. If the user elects to replace it, the local copy is replaced with an official distribution copy of the title or track. In the event that the user chooses to distribute the content as a new title or track, or if the initial processing found it to be new material, the media distribution center finishes processing the content for distribution, possibly requesting more information from the user via the player/viewer over a period of time as it validates the content for general release. Once the title has released, the player/viewer automatically upgrades the user's banned copy to an official copy appropriate for redistribution.

In this way, the distribution system of the invention may allow individual consumers 102 to provide new titles and tracks for distribution. To the extent that this feature serves the role of a public access forum for media distribution, the player/viewer user interface may include logic for any additional functionality that is signaled whenever it detects that it is running this class of media. For instance, it can have a control button that reads "Click here to support this . . . " appear automatically at some point during the content's use session. When a user presses this button, a dialog or other interface appears, providing a direct way for the user to enter a donation amount and have it charged to a credit card or other type of billing account, perhaps one that is already on file for the particular user in the distributor's central database, all at the click of a button. At the discretion of the distributor, part or all of this donation amount may be credited to the user account of the individual consumer 102 who imported the new title or track for distribution.

When media is imported from a consumer, there is the possibility that invalid content may make it past the initial review process. If user-contributed content is distributed through the system, then later found to be equivalent to a copyright-holder provided title, the distributor can provide for the automatic replacement of such secondary content with the version approved for distribution. This process is known as "media rotation". Similarly, if a copyright-holder identifies invalid content and does not wish to have it further distributed, the content may be either banned for redistribution or recalled entirely, having all existing copies removed from the system.

Referring now to FIG. 3B, there is shown a diagram depicting the economic aspects of the distribution method that this player/viewer software enables according to the invention, to better illustrate the nature of its improvement. Three different playback control paradigms are considered along a horizontal axis 350, and a vertical axis 352 measures the relative utility of each paradigm to either an average consumer 102 or an average copyright-holder. Plot 356 is the utility to the consumer for each playback paradigm, and plot 358 is the utility to the copyright-holder for each playback paradigm.

In playback paradigm 362, consumers freely redistribute copyrighted content amongst themselves, and a consumer who obtains such a copy has complete control over the use of it. This situation has high utility level 360B for the consumer, who is getting something of value without paying for it, and it has the lowest indicated utility 360F for the rights-holder, who loses large amounts of revenue and control as the consumers freely redistribute the copyrighted content in droves for unlimited use, with many of them never paying the rights-holder. This scenario has arisen in recent times as a result of the technological developments described in the background.

With an ordinary digital rights management (DRM) or copy-lock system in force, playback paradigm 364 applies. In this case the distribution system strictly denies all consumers who have not licensed a particular media content title from access to it. The paradigm enforces a strict control of use policy on the part of the distributor, without a facility for a free general use allowance, and in the process, maintains a price for use status quo, where digital media content is licensed to consumers for a fee.

With paradigm 364, the utility for the rights-holder has moved up to level 360C, and the utility for the consumer has dropped to level 360D. Following the paradigm, the rights-holder can enforce a strict grant of use policy on all consumers who use media content under such a paradigm. However, relative to paradigm 362, the consumer loses the ability to request media content on demand and use it for free, which is a considerable drop from level 360B. Also lost to paradigm 364 is the right to make unlimited copies for personal use. Given the extent of this drop, some consumers are strongly motivated to use any means at their disposal to obtain free access to content, and there is a large economic force driving these consumers to break such DRM-based distribution systems, producing a constant effort on the part of consumers to establish and maintain paradigm 362.

Furthermore, it is believed that media content has a very large potential market and a high price elasticity of demand. That is, the viewership of a particular media property increases dramatically as the price for use drops, even in the presence of advertisements. As a result, the potential for revenue from ad sponsorship is all the higher.

Playback paradigm 366 is facilitated by the method of the present invention, and enforced by the player/viewer software as described above. Media content is distributed to consumers freely and on-demand, however, through its use of a highly controlled playback apparatus, the method of the present invention has the power to require and enforce the presentation of paid advertisements inserted at regular intervals within the requested media content, whenever a consumer uses any media for free under the general license.

In this system, the consumers utility level has now risen to 360B', which is much closer to level 360B than to level 360D, by the reason that a consumer would much rather bear commercials in exchange for free use of media content than not have free use of any sort. Meanwhile, the copyright-holder's utility has also increased greatly to level 360A, because more viewing of paid ads by a much wider audience produces a greater source of revenue than a considerably smaller number of direct sales.

The system is an improvement over conventional digital rights management systems because it offers benefits to both the copyright holders and the consumers. From the consumer's standpoint, the drop from utility levels 360B to 360B' is much smaller than that from levels 360B to 360D, so there is much less incentive on the part of the consumer to engage in piracy and other attempts to circumvent the digital rights security put in place according to the invention.

Advertisement Sequencing Styles

Referring now to FIGS. 4A and 4B, there is shown a schematic diagram depicting some representative player/viewer media use sessions as they run over time. FIG. 4A illustrates three primary styles of advertisement sequencing that may occur in combination over a playback sequence of requested audio or video media content, as defined previously above. FIG. 4B illustrates the general style of ad sequencing that occurs in the process of viewing and browsing print media content, as defined previously above.

Media content exists in the form of titles and tracks, as defined previously above, and the user can have the player/viewer run any combination of available titles and tracks in any possible order. If a long-playing title has no tracks, or if a single track runs excessively long, the distributor may specify the division of the title or track into a series of contiguous segments. A title or track that contains more than one segment is a segmented title/track, in contrast with an unsegmented title/track consisting of one single segment. The distributor 120 assigns segment divisions on an item-by-item basis, and throughout distribution, these division locations accompany their associated title/track, in a fashion similar to the way the locations of all tracks on a title accompany the title when it is delivered as a single unit.

Segments would not ordinarily be ordered separately from the distributor, but the player/viewer's saved play-lists may contain individual segments. One purpose of segment divisions in a track or title is to indicate appropriate points within the material for the player/viewer to intersplice ads in the course of presenting the content. By this definition, a title may contain segments, or tracks, or possibly segments within tracks, but not tracks within a segment.

In FIG. 4A, the passage of time over the course of playback is represented as a horizontal timeline 400. There are shown three example sequences of audio or video media playback 402, 404, and 406, each of them conveying content interspliced with advertisement blocks. These sequences are shown as video with audio, but the following discussion applies just as well to silent video or audio-only media. Using ordinary methods, the player/viewer can convey either of these styles just as well by leaving the video blank or the audio silent, or it may alternatively employ some other logic to fill in for blank video or silent audio with its own images or sounds.

As described above, the player/viewer has the power to intersplice paid commercial ads into the presentation stream intermittently over time throughout the course of playing an audio or video sequence. The media style of these ads may include some combination of audio, video, and/or print-based components, excluding the trivial case of no presentation at all. However, from these possibilities, there is typically only one such choice that strictly matches the media style of the content in play, and at most two in the event that different media component styles occur in the content immediately before and immediately after the interspliced break.

In the case where the media component style remains the same before and after the ad break, there is a unique choice of ad media style to match content media style. For instance, in the midst of audio-only content, it is an audio-only ad. In the midst of video with audio content, it is a video with audio ad, and so on. The player/viewer's advertisement manager has the power to call for this specific style of advertising to suit whatever content style is in progress, and this particular methodology of matching content media style with advertisement style, for the purpose of programmatically interrupting the same media stream conveying the content with ads taking the same form, is novel in the realm of digital media players.

Applied to video and audio, this advertising methodology is a new use of the advertising style familiar to audiences through ordinary television and radio broadcasts. However, in the present invention, these advertisements are sequenced together and inserted into the content stream extemporaneously (i.e. "on the fly") by software running independently on each consumer's device, in response to the consumer's particular media requests and interactions with the specific content session running on each device. In an alternate embodiment of the invention, which may be employed for example in satellite radio or digital cable television receivers, targeted advertisements may be interspliced into an original broadcast presentation in real-time, thereby providing broadcast programming with promotional material tailored to the preferences, demographics, or other relevant criteria of individual users, in addition to and/or in place of those ads specifically associated with the broadcast media.

These ads are not required to appear in the same media form as the user-selected content, though in many cases, they do. According to the invention, it is even possible for an advertisement or media content segment to contain special tags and program logic to signal the player/browser to produce specific software-controlled actions, such as special buttons in the interface, displays, or user interactions. For example, at some point in the playback of a video title, the player/viewer can display a pop-up dialog or flash a control in its user interface that reads "Click here to buy this . . . ", with logic to take appropriate action if the user responds. This same feature provides a mechanism to supply interactive user polling in the midst of the media stream, or in place of ads, by presenting hypertext data input forms and delivering the user responses back to the distributor 120.

Referring back to the figure, play sequence 402 contains both segmented audio/video content, shown throughout FIG. 4A as wavy lines, and blocks of audio/video commercials, which are shown throughout as saw-toothed lines. Content segments 430, 432, 434, and 436 comprise the media title the user has requested for play, and each of advertisement blocks 408, 410, and 412 is a group of at least one or more ads and/or other promotional material that the player/viewer software has automatically assembled and inserted into the sequence.

In the course of direct play, without any user-directed skipping from one point to another or performing other navigation throughout the content, sequence 402 begins with content segment 430. Segment 430 immediately proceeds into advertisement block 408, which is followed by content segment 432, ad block 410, content segment 434, ad block 412, and content segment 436.

Play sequence 402 is typical for a segmented title/track, by the definition of segmented media given above. With segmented media, the player/viewer holds a sense of particular ad blocks retaining their own sense of place in the sequence, with the ads chosen to go along with a predetermined portion of the content. If the consumer elects to skip around during the course of playing a segmented title, the same block of ads plays with a particular portion of the content as the user skips back and forth through different parts of the title, over a predetermined period of time and/or number of viewings. If the predetermined limit is exceeded, the player/viewer rotates in new ad blocks automatically.

Segmented titles are sequenced like television programs, in that ad breaks tend to occur at particular scheduled places in the content. The first time through viewing any particular segmented content with ads, each block is shown before or after its associated content, and the player/viewer requires the ads to be run in their entirety. After that, when ad blocks that have been seen already are encountered again through a user-directed repeat of a sequence in a single request session, the player/viewer may allow the user to navigate out of the ad, or possibly omit it altogether.

For example, if the user of sequence 402 jumps right into segment 434 as segment 430 is just starting, the player/viewer will begin segment 434 at its point of entry, followed at its end by ad block 412. Wherever possible, the ad block chosen for play at the end of a segment will be the one most appropriate to the actual part of the content that has played since the latest preceding ad block.

In some cases, there may be a need to insert an ad block just before resuming play after a user-directed skip. For instance, if the user has watched 80% of segment 432, and then jumps into the middle of segment 434, ad block 410 plays immediately, and when it is finished, content play resumes at the point selected in segment 434.

Generally, the ad blocks presented during segment play occur either at the start of a segment, immediately following the end of a segment, or if necessary, just before resuming play after a user-directed skip. Logic in the player/viewer determines which of these are necessary as a result of the consumer's most recent viewing, and selects the most appropriate of the predefined blocks to insert at that point. If the same block is repeated excessively, the player/viewer has the power to rotate new ads into play at some point.

Play sequence 404 results when the user chooses a series of individual tracks for play. Common tracks include short songs and music videos, where each item is an individually-named short work. In this particular case, the consumer has selected to a play list of content tracks, 440-462, and the player/viewer automatically inserts advertisement blocks 414 and 416 into the play sequence. These individual tracks were selected haphazardly from among several different titles.

With tracks, the location of advertising blocks is determined by the player/viewer's program logic, which upholds an average content play time, an allowance based on the number of tracks, or possibly some combination of these or other approaches on a case-by-case basis, to determine where it inserts the ad blocks. Whatever method it uses, it places the ad blocks between individual tracks, or runs them just before resuming play upon a user-directed skip into the middle of a track.

During the course of regular play without skipping around or other navigation, sequence 404 begins by playing tracks 440, 442, 444, 446, and 448 in series, followed by ad block 414, and then tracks 450, 452, 454, and 456. After track 456 comes commercial ad block 416, followed by tracks 458, 460, and 462.

Tracked titles are sequenced like radio programming, in that the ad breaks tend to occur after a certain number of songs are played, after a certain amount of playback time has elapsed, or at song breaks nearest to particular times of the hour. In the case of the player/viewer, the user can sequence any combination of tracks together, and the ads chosen may in part reflect the specific tracks used. This has a direct implication when the consumer jumps around haphazardly in a requested play-list, or chooses to repeat a small subset of the tracks in the requested sequence.

For example, in sequence 404, consider a case where the program is using a track allowance method for ad placement, with an initial allowance of 5 tracks per ad block. If the user decides to play track 446 and then track 456, the program does not insert ad block 416 immediately after track 456. Instead, play goes directly into track 458, because the allowance is 5 tracks. If the user plays through most of track 458, then jumps to the beginning of track 442 and plays it, there is still allowance for one more track after that, since only four tracks (446, 456, 458, and 442) have played so far. If the user then jumps to track 452, an ad block will play immediately after track 452 completes, or if the user attempts to leave track 452 after hearing most of it but before it completes, because it is the fifth track. This ad block will be assembled extemporaneously to go with the five tracks that were played, and there is no retained sense of recurring blocks falling at specific points when the user skips around between tracks in a play-list. Typically, ad blocks interspliced in this way require full play with each occurrence, and the player/viewer manages its adaptive ad selection to present new ads every time, to a certain extent.

It is also possible for long-playing material to be completely unsegmented, as is the case in sequence 406. With unsegmented content, a large ad block 418 is inserted at the very beginning of the program. The ads play in sequence, and when they are finished, the content 470 plays in an uninterrupted fashion. Even when a title or a lengthy track has segments, the player/viewer may elect to run it in this unsegmented fashion in response to instructions from the distributor 120.

Referring now to FIG. 4B, there is shown a schematic diagram of an ad-sponsored print media session. The consumer views the print media one page at a time by issuing page turn commands. Under a page allowance ad placement mechanism, an ad or block of ads is run after a set number of page turns (5 in this case). When paging through print media in this fashion, moving either forward or backward in the material may be counted against the page allowance, or the mechanism may count only turns to pages that haven't been viewed within a limited time period, such as in the last five minutes, for instance. In addition to page allowance triggered ads, ad blocks may also be inserted at the end of each "chapter" or other appropriate section division in the print media. Chapters in print media are equivalent to audio/video segments, and the software handles them both in the same manner.

As noted in FIG. 4A above, these ads are not required to appear in the same media form as the user-selected content, though in many cases they do, and the same possibility for an advertisement or media content segment to contain special tags and program logic to signal the player/browser to produce specific software-controlled actions exists. In general, page allowance triggered ads will be print based ads, such that the user may briefly be exposed to an advertisement, then can quickly page out of the ad or ad block, and return to the print content so as not to loose their train of thought while reading.

The timeline measure for print media is the number of user-activated page turns 480, and ads are sequenced according to a page-turn allowance, as described above. Ads may also occur at the boundaries of chapters, which are the print media equivalent to segments, discussed above. Print based media involves any combination of print 482, which encompasses many forms of page-based text and image layout, audio 484, video 486, and user-software interaction 488, in the fashion of hypertext applications. When the player/viewer inserts an ad block into print media, the ads may also employ any combination of these means (482, 484, 486, and 488) to convey their message, though as noted they tend to be in the same style as print advertising where print ads are interspersed with print content as they have traditionally appeared in newspapers and magazines.

For the print ad containing audio 490, the audio and any associated visual advertising content complete at the same time. When a visual aspect of a print ad is in progress, user-activated page turns are disabled, unless the ad itself includes specific logic to handle them. When all in process visual aspects of the ad have finished, or when none are present to begin with, the user may resume paging. In the case of a print ad 492, with an audio message continuing beyond all of the ad's visual aspects, the user may turn pages while the audio is still in progress. Below, FIG. 10B explains in detail the player/viewer's logic to convey ads with print media.

Figure 5A:
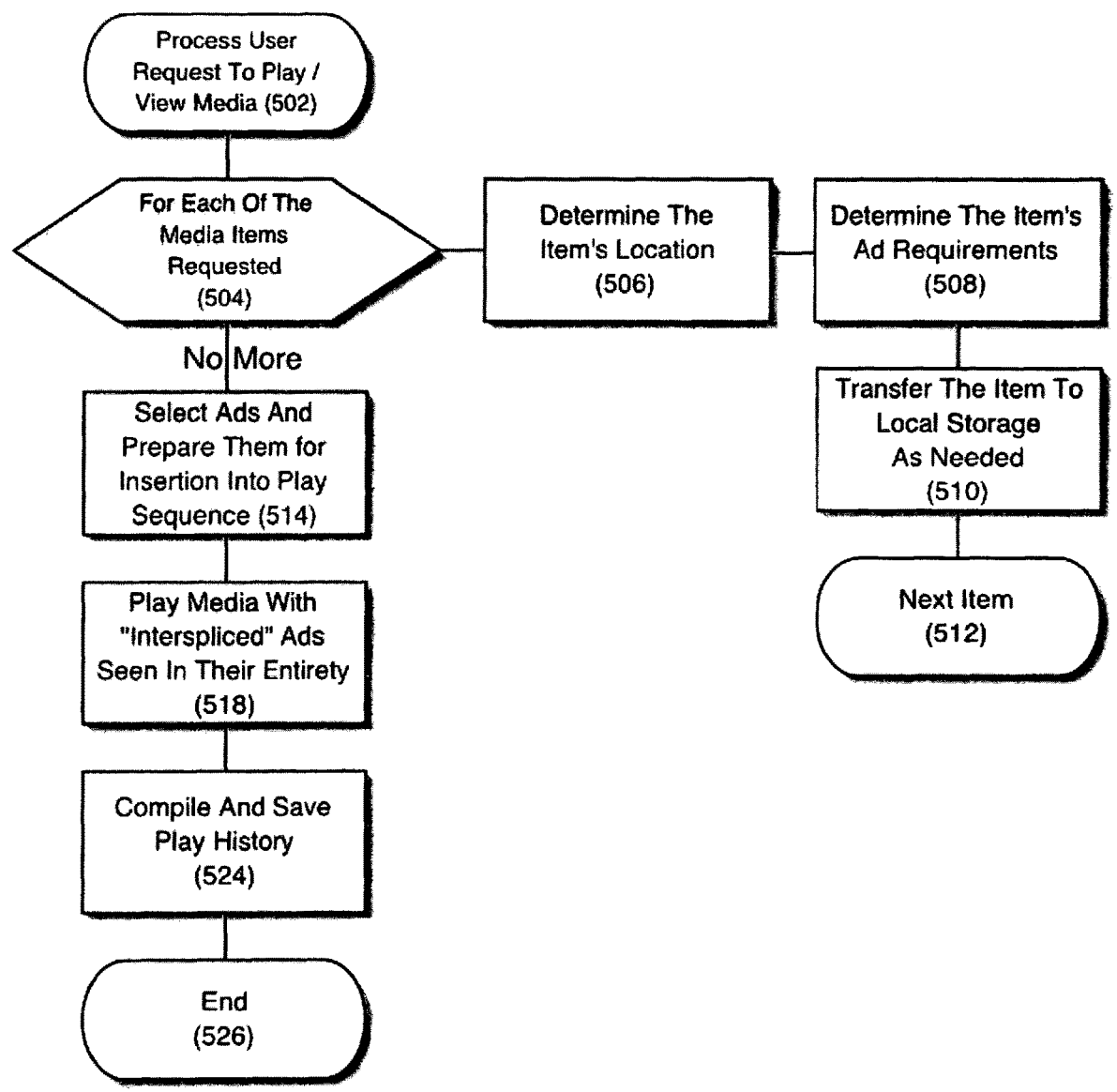
FIG. 5A is a flowchart illustration of software operation in response to a user request to run media content, according to one embodiment of the invention.

Referring now to FIG. 5A, there is shown a flowchart to illustrate the logic by which the player/viewer software processes a user request 502 to play or view some media, according to the invention. Request 502 may arise from, among other things, a direct file open operation, a selection from a remote media catalog or local media database, a selection of a user-defined play-list, a result of a media search engine or other web-based service, or some other user-driven command in the player/viewer. For example, in order to compile a user defined play-list from which a request 502 can be initiated, a user might acquire media files through any means available, including, but not limited to, browsing for a selection from a media repository, catalog, or library (e.g., as a part of, or in conjunction with, media catalog 566 described below), or via a peer-to-peer transfer.

Generally, the operation will begin with a list of one or more requested content items, the "media request list", which has an entry for each track, title, or in some cases, individual segment of a local track or title, chosen for play in the user-requested order. Segments are generally not released individually, but once a title is local, a play-list may have the option to sequence individual segments into a play session.

Once the media request list is established, the list is then populated in a process loop 504. First, in step 506, the program identifies the item and determines the location of the most conveniently accessible stored copy of it, either locally or over the network, relative to the processor 202 (FIG. 2) running the program. The program accesses the item to verify its location and to extract any relevant internal data tags stored within or alongside it. As this step finishes, the program expands the item's entry in the media request list to include fields for its identification, verified location, and certain data tags containing information or access keys. This has the effect of turning the media request list into a table of data records, which for sake of continuity, retains the name "media request list" in the ongoing description.

In step 508, the program determines the ad requirements called for by the item, by checking if any specially granted or restricted service levels apply on the content's use. If the distribution system does not provide for this determination, the player/browser may apply a "general license" that allows for free use of the item with the enforced intermittent insertion of paid ads into the content stream. Otherwise, the player/browser employs these means to retrieve or compute any specifically applicable service level and access key parameters, which are then added to the item's entry in the media request list. Without loss of generality, this determination may occur through direct use of any tags obtained as described in step 506, possibly in conjunction with a local, distributed, central, or other database.

To enforce security, a database that functions in this capacity employs data encryption and other digital rights management practices, to bar the consumer from any direct access to this information. When such a database is used, the running player/viewer is typically the only component of the consumer's system with the power to access it, thereby maintaining it under the distributor's exclusive control on all such systems.

In step 510, the media item is transferred into local storage in accordance with a preset or predetermined localization policy. That is, if the item's verified location is too remote for direct playback, the program transfers the item to a more local destination and updates any pertinent data, such as the verified location, in the item's media request list entry. The media transfer logic has the option to re-register the item during the course of this transfer, which may further affect the item's media request list entry.

This finishes the processing of the item in loop 504. In step 512, the program returns to step 504 to process the next item through the loop. When the program has finished processing all the requested items, the loop exits, passing control to step 514.

In step 514, the program selects appropriate ads to go with the media request list and prepares them for insertion into the content play/view sequence. It selects which ads, if any, are to interrupt the requested content during the course of play, and then it localizes them. It groups the content into play sections, and it groups individual ads into blocks for insertion into the content. It also determines the rules and parameters by which step 518 adaptively selects and groups ads extemporaneously in response to user actions during playback, and provides an ongoing maintenance service to rotate ads into and out of play as needed during the course of the session. Given the nature of its operation, step 514, and the logic it comprises, is referred to herein as the "ad manager".

In step 518, the program plays (or for print content, displays) the requested media with ads, each of which can be forced to run in its entirety, interspliced into the content play sequence. Adhering to the selections of ad manager 514, the program sets up a play sequence of individual content segments interspliced with blocks of ads, and it coordinates the real-time conveyance of the interspliced content/ad play sequence to the user in real-time, by way of the system's video display 206, 222 (FIG. 2) and audio output 208, 224 (FIG. 2) hardware. Given the nature of its operation, step 514, and the logic it comprises, is referred to herein as the "intersplicer".

The program's behavior in step 518 is directly influenced by certain user interface commands that enable the user to make arbitrary navigational choices through the requested content's playback. The main job of the program in step 518 is to adaptively select and re-sequence ads extemporaneously in response to these user choices. In this process, the program maintains a history of the playback it has performed, which is a direct record of the user's navigational actions through the content and the program's own ad choice and sequencing decisions. While in step 518, the program occasionally saves a persistent checkpoint of this play history, which it can recover later in the event of, for example, a system failure.

According to this particular embodiment of the invention, the program disallows user actions that alter the course of playback while a required advertisement is running. The logic for this behavior lies in step 518, which keeps settings in memory to indicate the current state of play, including a value to indicate whether or not a required ad or ad block is in progress. Commands to alter play from the user interface are influenced by these settings, and in turn update them to modify playback (FIGS. 8A-8D, 9A-9C, 10A, and 10B). The program remains in step 518 until an appropriate user command or system maintenance action signals it to end.

In step 524, the program compiles and saves the play history retained from step 518 into records on media usage and ad penetration, for each particular title and advertisement that ran during the course of the session. Media title usage records retain a detailed profile of the user's navigation throughout the content. Ad penetration records retain the number of times the ad was run, the track or segment associated with each run, the ad selection criteria behind each run, and other parameters. These records are saved to persistent storage, where they influence future ad management decisions and may eventually be sent back to the distributor to determine viewership ratings and for additional analysis/review.

Program control proceeds from step 524 to step 526. In step 526, processing of the user's request to play/view media ends, and the session is done.

Figure 5B:
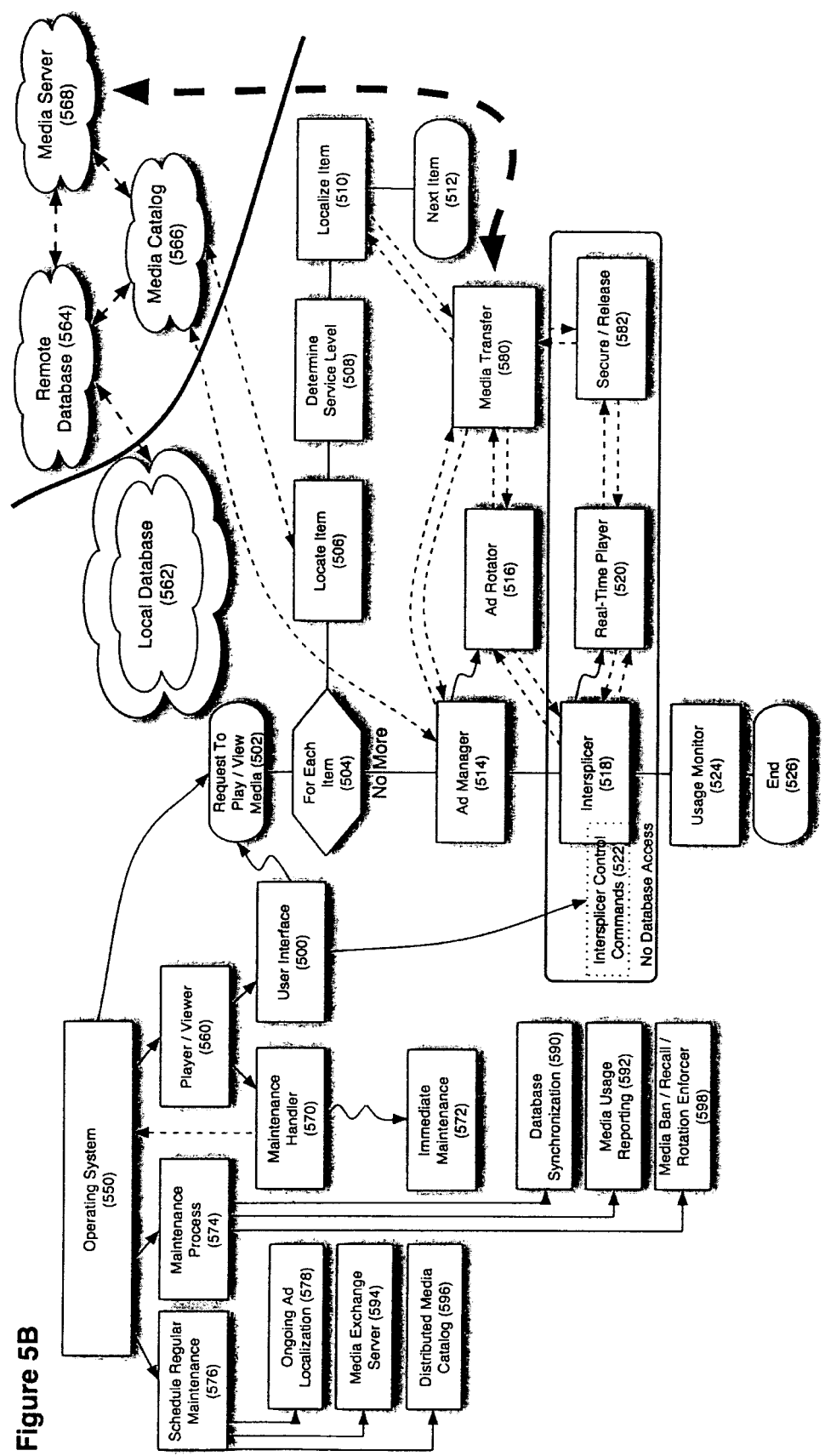
FIG. 5B is a block diagram illustrating certain software components that operate together to carry out the method of FIG. 5A, according to one embodiment of the invention.

Referring now to FIG. 5B, there is shown a block diagram to illustrate how the logical components of the player/viewer operate together in carrying out the logic described with reference to FIG. 5A. Where numbers coincide between FIG. 5A and FIG. 5B, the numbered component in FIG. 5B carries out the corresponding logical step in FIG. 5A.

The operation begins from operating system 550, running on the consumer's computer 104 or other device. To use the player/viewer application 560, the user interacts with the operating system 550 to either launch player/viewer 560 directly or to open a media file that brings about its launch with an immediate request to play media 502.

As player/viewer 560 begins, it starts its user interface 500, which either waits for the user to make a request 502 through it, or starts with request 502 initiated by operating system 550 to launch request 502 as soon as it brings up user interface 500. Player/viewer 560 also launches a maintenance handler 570, running concurrently with user interface 500, to handle any internal maintenance that player/viewer 560 ordinarily runs during its course of operation.

The player/viewer 560 uses concurrent software design practices, and this description of the invention generally applies the term thread to indicate each conceptual program step or process operating in parallel by way of a software design practice that implements concurrency, even if the practice does not employ threads specifically. By way of concurrency, player/viewer 560 may have a number of requests 502 to play/view media running simultaneously, though as a rule only one of them has user focus at a time, and typically only one is visible at a time as well.

Maintenance handler 570 serves a variety of maintenance purposes. Aside from performing program maintenance itself, it may directly launch other immediate maintenance 572, direct the operating system to run another program as a background maintenance process 574 that persists after the player/viewer 560 program has exited, or possibly direct the operating system to persistently schedule a regular maintenance job 576, a job which then starts automatically either at system startup or at some regular time, even when there is no running player/viewer. Maintenance handler 570 may also provide coordination services to other operations establishing maintenance tasks of their own, such as ad manager 514.

One service that the player/viewer maintains is local database interface 562. This database serves as the program's store of user information and preferences, which may include without limitation, local media locations and registration data, content and advertisement viewing history, security keys, availability and locations of local ads, and other system maintenance data. Most logical operations in the program access the local database 562 in some way. Specific connections to database 562 are not all shown explicitly, so as not to unnecessarily obscure the drawing. If it is designed to contain sensitive information, this database is maintained under strict distributor control, using digital rights management practices.

Local database 562 may be self-contained in persistent files on the consumer's device, or it may extend over network 100 to a remote central or distributed database 564, which is controlled by the distributor 120 (FIG. 1). Another remote service that the program may use is a central or distributed media catalog 566, by which the player/viewer 560 may acquire information about any existing media titles or tracks, including but not limited to location, description, reviews, and available licensing options, among other things. The program may also use a service which employs a central or distributed protocol for media delivery, conceptually acting as a single media server 568. Where present, services 564, 566, and 568 communicate with one another, and each one may consult either of the other services to handle a particular request.

The Network Administered Services Embodiment

According to the invention, there is a particular embodiment with additional features and different advantages, as supported through the apparatus and method of this invention as discussed up to now. The following discussion expands on the earlier discussion of these same steps in reference to FIG. 5A, specifically in the context of this particular embodiment, which is called the "network administered services embodiment".

The network administered services embodiment uses local database 562, working in part as a locally relevant mirror of central/distributed remote database 564, which is administered centrally by one or more of the distributor's media distribution centers 122, and secured under strict control of distributor 102, in all consumer-accessible places, by means of digital rights management methods, according to the invention. Such data is also secured while in transit over network 100, via a software-secured layer or other security mechanism.

The network administered services embodiment also provides a media catalog 566, which may involve one or more media distribution centers 122 (FIG. 1) acting as central servers, a peer to peer network of distributed media catalog servers 596 running on consumer systems, or some other configuration.

To deliver media to consumers, the network administered services embodiment provides both a centrally administered system with media distribution centers 122 (FIG. 1) serving transfer requests from consumer client systems, and a peer-to-peer network of media exchange servers 594 running on consumer systems to provide a means for these systems to negotiate and conduct media transfer directly from one to another. This embodiment employs ordinary and new practices to optimize bandwidth utilization throughout its media delivery system, which is the apparatus providing media service 568 to player/viewer 560.

Bearing these services in mind, there is shown an indication of the inter-operational communications that take place in the course of the logic discussed in FIG. 5A. The beginning of a request to play media occurs at step 502, and step 504 is a loop over each item in the media request list.

In step 506, the program identifies a media content item on the basis of a unique universal identifier stored in any number of locations, including, but not limited to, local database 562 and/or the media file itself. The program then uses the identifier to locate the item by first going to local database 562, and if not found, to media catalog 566. It verifies that a requested content item is available, either locally or via the distribution network, through a test access in which data tags that may be present in local database 562 and/or the media file are extracted. If the user selected the item as a local file or archive, the program may get some or all of the information it needs directly from the file, as opposed to checking local database 562, to determine the item's location. In any case, it makes sure the content is available at the specified location, and if it finds a problem, it may seek assistance from the user, perform an additional local search, or if possible, go directly to remote sources to locate a copy of the item.

In step 508, service level determination goes first to data held in memory in the media request list, from step 506, and then to local database 562, which consults remote database 564 as needed. The distribution network maintains a full-fledged extranet for the purpose of media licensing, and the step of service level determination 508 becomes one of license verification in this embodiment. Each individual consumer gets a password-protected user account, and zero or more specific installations of the player/viewer software are registered to each user.

This embodiment provides for many user services administered via network 100, including but not limited to those noted here. There may be user profile sharing, by which a user can access on a temporary basis, from a system or device other than their own, media that has previously been licensed to them. There may be multiple ratings systems provided, by which the consumer may choose to evaluate the quality and appropriateness of particular media based on any number of different criteria, including content ratings and critic and user reviews. There may be child accounts and media restriction controls, by which a primary account-holder can set up dependent accounts and limit the content viewable by dependent account-holders. In this instance, media may be restricted or allowed on any number of different criteria, including its level in any of the provided ratings systems, or by specific title or track.

Through user registration, this embodiment also provides for targeted advertising choices, conducted by the ad manager in the course of selecting ads, on the basis of user demographics, preferences, and other consumer specific criteria, on a session by session basis. This also applies to streaming audio and video, for which the intersplicer mechanism described below can allow for the user-targeted adaptive insertion of specific ads into a digital broadcast media stream at times signaled from the media stream. In this case the player/viewer software will run maintenance to localize appropriate ads for each streaming broadcast. In the absence of localized ads for a broadcast stream, the player/viewer may run a general ad that is broadcast with the stream.

The licensing/registration database is maintained centrally on the media distribution centers 122, with local mirrors on each consumer system providing immediate and constant access to all of a specific user's licensing data. Individual media titles and tracks are licensed on a user-by-user basis, and digital rights management methods are employed to maintain the integrity of this system. When a consumer device is not connected to the network, the local database mirror contains enough information to run any content that the user has expressly licensed.

This license verification system offers and keeps track of a wide variety of service types, which ultimately affect the service level determination result. For instance, on a userby-user basis, each title may be offered and licensed as free for use with commercial interruptions, free for use without commercial interruptions but with requested user support, included (with or without ads) as part of a specific subscription package, specifically purchased for uninterrupted use on a short-term basis (fixed time period or total number of uses), and/or purchased outright for permanent uninterrupted use. With such a system, the distributor maintains absolute control over what services are offered with each piece of media, and through it, the copyright-holder can choose to offer or withhold any of these service types on a title-by-title basis.

There are several other functions through which this license verification system offers the distributor 120 even more control. For instance, a media file can be tagged as "banned for redistribution," and the system will prohibit any user except the one to whom it is registered from being able to use it. In extreme cases, the system can enforce a "full recall" of any content that a copyright-holder has deemed to be on the system without their proper consent, and the system will automatically remove all copies of it from circulation.

Once an item's service level is determined, whether it be through full-fledged license verification or any simpler process, the player/viewer attaches the result to the item's entry in the media request list. In the event that the item has a service level that prohibits any use of it whatsoever, which occurs for example in the situation where a particular user has not made a special licensing arrangement and a free general license service type is not available for the item, the player/viewer will warn the user and possibly suggest any other options that may exist to enable its use. If none of these are offered or taken, then the item is removed from the request list.

Aside from either calling for ads or not, the service level may include one or more advertising requirement parameters, such as the relative ratio of content material to promotional material, the frequency of interruptions, or some other metric. It may also specify the removal of particular segments of the content from the play stream through one or more content-filtering parameters. The nature and count of these service level parameters is determined by the distinctions that the distributor chooses to provide. This completes step 508.

In step 510, the media item, if determined as valid from step 508, is localized. Localization of media takes place through the operational logic of media transfer 580. Player/viewer program operations that transfer media content to or from a consumer device's local storage go through this logic. The player/viewer transfers the content from the valid location determined in step 506, by means of media transfer 580, which acts through media server 568 to localize the media, using the most appropriate central server, peer-to-peer, or other network configuration provided by the distribution system.

In step 580, during the course of media transfer, the player/browser 560 may elect to release the media from its secured form and then secure it again according to a new key, as it stores the item to a persistent local destination. This operation involves the secure/release logic component 582, and it has the effect of re-registering the media to its new owner. The media transfer process also updates any tags that are stored with the content to reflect any registration aspects that may be maintained there, and changes to any security keying data are saved in the media request list, for eventual inclusion into local database 562.

Step 512 goes to the next item in the request list until all of them have been processed, and control passes to the ad manager 514.

Ad manager 514 first consults the information available to it in program memory in the media request list. Then, it goes to local database 562, operating consistently with remote database 564, when available, to apply its data on the specific user's demographic information, advertising preferences, system location, media usage, ad viewership history, and other criteria, in conjunction with general data on the title/track requested and the preferences of sponsors regarding the use of their ads, to determine a list of candidate ads.

Once the ad manager 514 has determined which ads it will select to go with the request, it goes through a locate and localize step for each ad, similar to those in steps 506 and 510. The locate step first uses the media request list in memory and local database 562 in conjunction with other local resources, and then it may go to media catalog 566 to locate specific advertisements on the network. The localize step goes through media transfer 580, to bring the ads onto the device.

Ad manager 514 also establishes a concurrent ad rotator 516. The ad manager may start a new thread for this purpose, or it may communicate with maintenance 570 to assign it a new or already-existing ad rotator thread 516. Either way, the ad rotator thread 516 gets associated with the thread of request 502. As different request threads 502 are hidden or made visible via user interaction, maintenance 570 may re-assign an ad rotator 516 from one media request thread 502 to another, or different ad rotator threads may exist for multiple requests 502.

Ad rotator 516 handles requests for new ads from an intersplicer 518 by selecting and localizing appropriate ads, grouping them into blocks if so requested, and sending the result back to requesting intersplicer 518. The ad rotator 516 is equipped to handle requests to replace individual ads, entire ad blocks, or the entire set of ads and blocks associated with intersplicer 518, without having to interrupt playback. Just like ad manager 514, it may use the logic of the media transfer component 580 for this purpose. Ad rotator 516 may also need to consult media catalog 566 to locate new ads, but this step is typically avoided through the ad manager 514, which pre-locates alternative ads and passes this information along to ad rotator 516. Ad rotator 516 also synchronizes the final media request list with local database 562.

Intersplicer 518 launches a new concurrent real-time player thread 520, charged with the computationally demanding task of real-time play/view performance, and it directs real-time player 520 in the sequence and manner in which to run. Playback starts from an initial section sequence table indicating how content is to be interspliced with ads, and is modified in response to intersplicer control commands 522 that the user issues with actions from user interface 500. The intersplicer maintains a history of all the playback it has instructed player 520 to perform, and it selects and re-sequences ads extemporaneously in response to the user's arbitrary navigational choices through the requested content playback.

Where intersplicer 518 sequences playback, real-time player 520 handles the playback of any arbitrary sequence of content sections and ad blocks that intersplicer 518 orders. In the process, step 520 maintains file descriptors, file pointers, and buffers. It secures its buffers, decodes compressed media, and releases for use any media content that has been secured through encryption, through the logic of secure/release 582. All of this happens extemporaneously in the course of real-time playback. Intersplicer 518 communicates often with its associated real-time player 520, to direct playback and follow what's playing. Intersplicer 518 also communicates with ad rotator 516 to request and receive new ads for its own adaptive local ad selection.

Intersplicer 518 finishes when either a user action or a timeout after program completion instructs it to end. In response to this instruction, it signals an end to real-time player 520 and ad rotator 516. Upon this signal, real-time player 520 ends itself and ad rotator 516 either ends or releases itself from intersplicer 518 and continues running to attach later to another media play/view request 502. In the meantime, ad rotator 516 may involve itself with ad localization or some other maintenance activity. Once the real-time player and ad rotator have removed themselves, intersplicer 518 ends.

Since intersplicer 518, real-time player 520, and secure/restore 582 are more time-sensitive than other components, the design of the player/viewer software generally has play request 502 conduct any necessary access of local database 562, which may invoke remote database 564, through other threads, while intersplicer 518, player 520, and secure/restore 582 are running in the request thread 502. This is a design choice, and the invention applies just as well to other software designs that function according to the invention.

The media and ad usage monitor 524 compiles the play history data from intersplicer 518 and incorporates it into local database 562, which ultimately synchronizes back to remote database 564, or otherwise communicates it back to media distribution center 122 (FIG. 1). This data is important, as it provides the basis for a sophisticated viewership ratings system, which the network administered services distributor 120 maintains as a direct or statistically-based compilation of media usage data gathered from every consumer 102 on the system, as well as providing ad penetration statistics for tracking the viewership of each ad, and a basis for future ad selection choices, delegated from remote database 564 in step 514, the ad manager.

In addition to the basic media use request operation that begins in step 502, there are several common maintenance tasks that occur regularly in the course of running the player/viewer software 560. Regular management of program resources may be handled by maintenance handler 570, or as a separate immediate maintenance thread 572.

There are also distribution-related maintenance tasks, which may be managed on an ongoing basis, either as an immediate maintenance 572, a maintenance process 574, or a scheduled regular maintenance 576. These may without limitation include ongoing ad localization 578, database synchronization 590 between local database 562 and remote database 564, any special media usage reporting 592 that is not included as part of regular database synchronization 590, the provision of a media exchange server 594 to handle peer-to-peer and other direct consumer-to-consumer media transfer aspects of general media server 568, the provision of a distributed media catalog server 596 to act as a component of media catalog 566, and the enforcement of distributor media recalls, bans, and rotations 598 as described above with license verification in step 508.

DETAILED OPERATION OF THE INVENTION

Figure 6B:
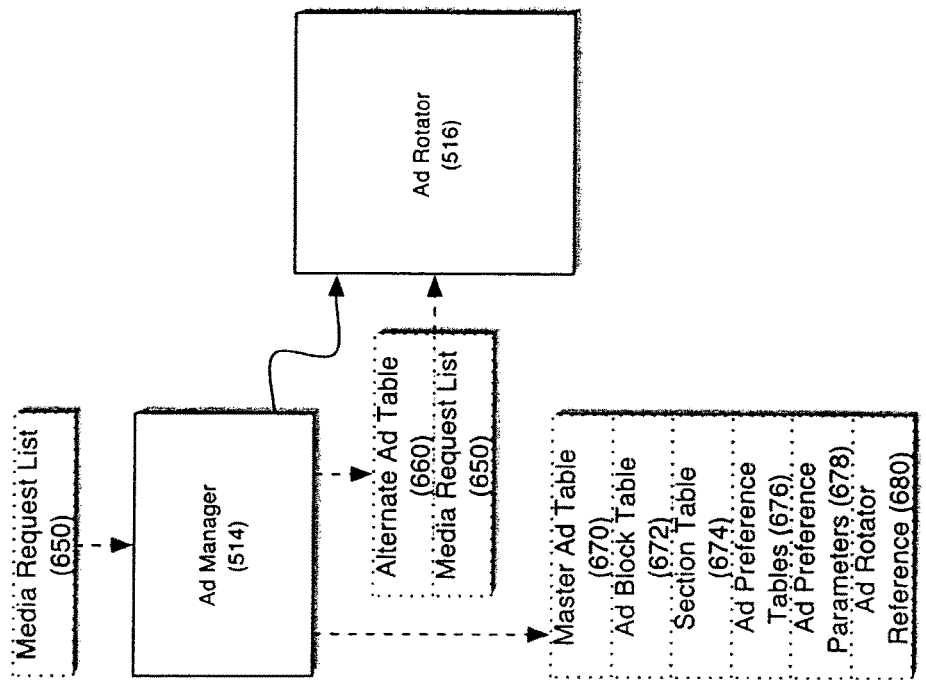
FIG. 6B is a block diagram illustrating in more detail the flow of data between certain software components operating in FIG. 6A, according to one embodiment of the invention.
Figure 6A:
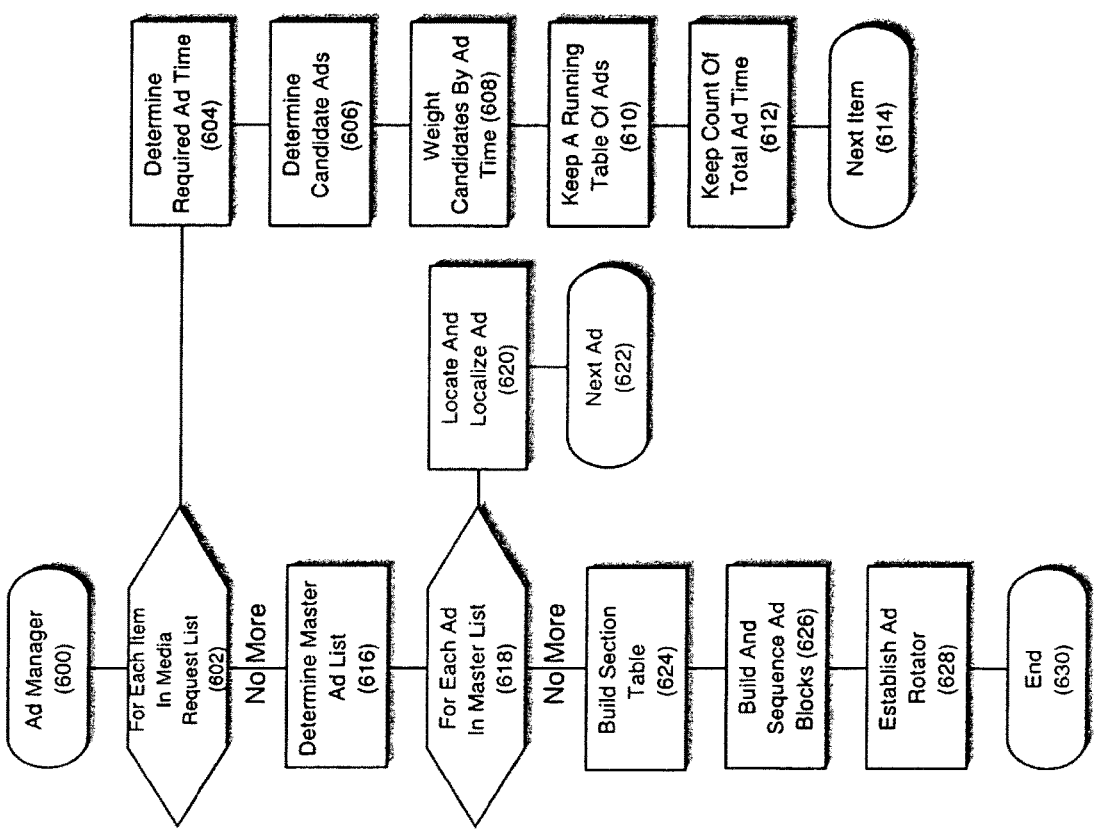
FIG. 6A is a flowchart illustrating one particular method for performing the ad selection operation of FIG. 5A, according to one embodiment of the invention.

Referring now to FIGS. 6A and 6B, there is shown in FIG. 6A a more detailed flowchart of the operation of step 514, the ad manager. In FIG. 6B, there is a block diagram that indicates the data stored in memory and exchanged in association with the logic of steps 514 and 516.

Referring now to FIG. 6A, there is shown a flowchart illustrating in more detail the method by which the ad manager, step 514 (FIG. 5A), operates according to this particular embodiment of the invention. The ad manager begins in step 600 with a media request list 650 already stored in memory. In step 602, it enters a loop to process each item in media request list 650, one at a time. This processing proceeds to step 604, where the ad manager determines an optimum amount of advertising time required by the item, based on information saved earlier in the media request list 650. The resulting ad requirement is an arbitrary function that can depend on, without limitation, one or more of the following: the item's running time; the number of segments it contains; and/or its advertising requirement parameters, determined with its service level in step 508.

In step 606, the ad manager produces a list of candidate ads specifically tailored to the media track/title in question. This candidate ad list may derive directly from data and/or advertisements embedded with the content in a file or archive, or it may be the result of a query to a local or remote distributor's database. Generally speaking, the resulting list will be a function of the specific media title, its parameters from media request list 650, available data on the user's previous advertising and media usage history, recent ad localizer maintenance downloads, user preference settings that may be in effect on the player/viewer, user advertising preferences, and relevant user demographic information.

Except when the result of step 604 is zero by way of a privileged license, the resulting list contains at least one ad, and it will include enough advertising to cover some multiple of the item's optimum ad time determined above, with the multiple ranging from at least one to at most one hundred. Associated with each ad in the list are a number of attached parameters and weighting coefficients that specify each ad's relative appropriateness to the particular content item in question, with separate coefficients to cover multiple selection criteria, possibly including, but not limited to, the specific title/track of the item, the item's genre, demographic information about the user, and/or the geographic location of the system or device running the player/viewer. Other returned parameters may include ad running time, an overall ad preference rating, the type of product being advertised, some preferential ad block positioning, or other relevant usage rules associated with the ad. The ad manager uses these parameters in step 616, described further below.

Block positioning and other rules may be quite specific. For instance, there may be rules instructing a particular ad to be played in the block associated with a specific segment of a title, at a specific position within a block, or tied to another ad, such as two ads linked either at the beginning and end of a block, or in separate blocks that run after successive segments in a title. In step 608, the ad manager weights this candidate ad list by the ad time determined in step 604, to scale its influence on the ultimate choice of ads by the amount of required ad play time it contributes to the entire session. In step 610, this list is merged into the ad manager's internal ad table, which maintains each advertisement's parameters, preference ratings, and time weightings, on an item-by-item basis, as it combines ads that are common to multiple items. In step 612, the result from step 604 is added to a count of total ad time for the entire media request, to serve later in choosing the size of the master ad table. The loop then returns in step 614 to process the next item in media request list 650.

After loop 602 is finished, the ad manager goes to step 616, in which it processes the internal ad table into a preliminary master ad table 670. Using the total resulting length of required ad time from step 612, it selects enough ads from the internal table to have a running time greater than or equal to this result, giving preference according to the weighted sum total, determined for each ad in the table, of the metrics determined above. Then, it processes its internal table to yield a set of ad preference tables 676, which have been inverted to map ad selection criteria to a ranked list of candidate ads taken from those in the master ad table. This inversion allows the weighting coefficients and preference ratings, which are indexed by ad in the internal table, to be indexed by title, genre, demographic, or other selection criterion in each of the ad preference tables. The intersplicer uses these tables later to perform adaptive ad selection and sequencing in response to user actions.

After computing the preliminary master ad table 670, step 616 removes all the ads so chosen from its internal table, and maintains the result as an alternate ad table 660, which provides specific ad indications and selection criteria to make substitutions into the master ad table 670 as needed. When this is done, the ad manager proceeds to step 618, which loops through the master ad table, one ad at a time. In the loop, step 620 locates and localizes each ad.

In step 620, the ad manager determines the nearest location of the ad in question and verifies its presence there, potentially through the use of remote media catalog 566 (FIG. 5B). Once it locates the necessary ad, it may elect to transfer the ad to local storage if such an operation will complete in a reasonable amount of time, or it may elect to replace this particular item in master ad table 670 with a more accessible one from alternate ad table 660. Should this happen, it removes the replacement ad from alternate ad table 660 and merges the ad's selection criteria into ad preference tables 674. Once the ad has been either localized or replaced, the loop returns for the next ad in step 622.

Loop 618 terminates when every ad in the final master ad table 670, after any replacements have occurred, is present in a nearby location, either on local storage, or somewhere else where the available speed of access is determined to be fast enough for real-time play. If there is no way to localize enough advertisements to fulfill the requirements of master ad table 670, the player/viewer notifies the user of the situation and suggests connecting to the network or other appropriate alternative. If after this attempt, the estimated amount of time required to transfer the ads is prohibitive, the player/viewer notifies the user of the delay with a prompt to await transfer, continue now, or abort playback. If there is still no means available for transfer, or the user has chosen to continue now, and there aren't enough advertisements on the system to support the requested media, the player/viewer will offer to abort the request or play only a limited portion of it.

In step 624, the ad manager checks for media titles that contain segments, and builds a section table 674 of all individual segments and tracks comprising the content of the request, in preparation for the insertion of ad blocks at arbitrary points in the list. In this step, data from the media request list, such as title identification, access keys, file location, endpoint times, and genre of title, may be included with each entry in the section table 674. The main purpose of segments in a media track or title is to indicate appropriate points for commercial interruptions, and the ad manager has the power to decide which segments are run back-to-back, and which ones are to have ad blocks inserted after them. In many cases, every single segment in a track or title gets an ad block. In segmented items, the section groupings and ad insertion points set here are not altered by the intersplicer.

In step 626, the ad manager builds and sequences ad blocks into the requested content, according to the rules it has from various content, database, and ad sources. To do this, it first estimates the desired average ad block running time, possibly through the application of ad requirement parameters from the media request list, and the total running time of the content. From these results, it computes a desired average time between interruptions. It then uses section table 674 in conjunction with any ad requirement parameters from the media request list 650, which may call for the lengthening or shortening of ad block duration or interruption frequency associated with specific content segments, to build a preliminary list of ad blocks and sequence them into appropriate points in the section table, attempting to match the desired parameters as optimally as possible.

Next, it assembles ads from the master ad table into a set of blocks that optimally match the preliminary block times, possibly in consultation with a local or remote database to provide additional usage history and system data to aid in this process. For instance, when the user quits a request session during the play of a required ad, the system keeps track of this through the usage monitor 524 (FIG. 5B), and it may at this point in the logic set up an ad or ad block to run at the very beginning of a session. With these complete, the section table 674 and ad block table 672 are finalized.

Step 626 concludes with a determination of ad preference parameters 678 for track media. These parameters are computed from the ad requirement and other parameters described above. They may include a track allowance, for adaptive ad scheduling on the basis of allowed tracks, and a preference weighting, to apply to track allowance scheduling against time allotment scheduling. Other ad preference parameters may include relative weightings for title based, genre based, demographic based, location based, and/or other bases for ad selection that are provided in the ad preference tables.

Next, in step 628, the ad manager either launches a new thread or requests the maintenance handler to issue it an already existing maintenance thread. Either way, a concurrent ad rotator 516 is associated with the main request thread of ad manager 514. In the course of establishing ad rotator 516, ad manager 514 passes its alternate ad table 660 and media request list 650 to ad rotator 516, which retains them to handle requests for new ads. The first action taken by ad rotator 516 is to synchronize local database 562 with any updated information found in media request list 650, which may include file locations and security keys, among other things. After ad rotator 516 has modified local database 562, it waits for new ad requests from the intersplicer 518, handling them accordingly. Ad rotator 516 may also take it upon itself to act as an ongoing ad localizer, transferring new ad content to the local system to keep a steady supply of ads available for use. In this manner, future media play requests 502 can avoid the delays associated with ad transfer. Upon establishing ad rotator 516, ad manager 514 receives an ad rotator reference through which the play/view request 502 thread can continue to communicate with it.

In step 630, the ad manager ends, and the request that called it passes control on to intersplicer 518. The ad manager passes its master ad table 670, ad block table 672, content play section table 674, adaptive preference rules, which include ad preference tables 676 and ad preference parameters 678, and the ad rotator reference 680, to the intersplicer 518 (FIG. 5A), which retains them for its own use.

Referring now to FIGS. 7A and 7B, there is shown in FIG. 7A a more detailed flowchart of the operation of step 518, the intersplicer. In FIG. 7B, there is a block diagram that indicates the data stored in memory and exchanged in association with the logic of steps 518, 520, and 516.

Referring now to FIG. 7A, there is shown a flowchart illustrating in detail an example of one particular method of the operation of the intersplicer. The intersplicer begins in step 700, where it receives in memory a master ad table 670, an ad block table 672, a content section table 674, ad preference tables 676, ad preference parameters 678, and ad rotator reference 680.

Master ad table 670 contains location and other data about every ad that has been selected to run with the session. Ad block table 672 contains a series of ad blocks, each of which is a series of references to individual ads in master ad table 670. Section table 674 is a list of content sections with indications for any pre-programmed ad breaks, and information about the location of each media section, along with start and end time offsets. Ad preference tables 676 and parameters 678 are rules by which the intersplicer can perform adaptive ad selection and sequencing extemporaneously, determining and running new ad combinations in response to user navigation actions throughout the session. Ad rotator reference 680 is the point of communication for intersplicer 518 to contact ad rotator 516 to request ad rotation and other services from it.

In step 702, the intersplicer uses the content section table, master ad table, and block list table to build a raw section sequence table 780 of ordered sections. These sections may possibly include indicator flags through which the running real-time player 520 may identify the boundaries between content and required ads, or the program may rely on the intersplicer to check the player settings on a regular basis and determine on its own when required ads are in progress. The section sequence serves as a map from a time point in the overall sequenced session to a time point in a particular content or ad item, along with the identity of that item.

Next, in step 704, the intersplicer 518 initializes a set of player settings 782, which directly control how playback proceeds. It initializes player settings 782 for standard play starting at the beginning of the sequence determined in step 702, and it prepares all data pertaining to the play section sequence 780 and the player settings 782 for shared use with real-time player 520. Without limitation, player settings 782 may include the media mode (audio, video, or print), direction of play, play rate, video frame rate, audio sampling rate, sound volume, current media frame/location, redraw mode (update, no update, or black), and next media switch. In step 706, intersplicer 518 launches real-time player 520 as a concurrent thread, maintaining the means to exchange section sequencing 780 and player settings 782 back and forth between itself and real-time player 520. After step 706, the real-time media player 520 runs on its own and communicates back and forth with intersplicer 518, either through a block of common memory, a system of message passing, or any other appropriate means. Real-time player 520 runs whatever media is in its section sequence 780, according to its player settings 782, and all alterations in playback arrive to the player as data exchanged from intersplicer 518. Furthermore, real-time player 520 signals back to intersplicer 518 whenever it starts or finishes playing an advertisement block.

The real-time player is responsible for physically running the media content in context of the player/viewer, and running ads wherever the intersplicer has sequenced them into the material, as well as releasing for use any media content that has been secured through encryption, through the logic of secure/release 582.

The real-time player 520, monitors the section sequence table at regular intervals to adjust the way it buffers media content from local storage to memory, prepares to open and close files, and selects which specific timing and sequence of frames and/or audio samples to extract from storage and display/play. These operations occur in conjunction with a real-time clock or other interrupt signal that is employed to enhance communication with the audio and graphics hardware, to provide the smoothest and most pleasing display appearance and/or audio possible.

In step 708, the intersplicer communicates with the real-time player for the purposes noted above. When the intersplicer detects the start of an ad block, it checks to see if the ad block is required. When an ad block is required, the player/viewer disables playback-altering functionality that the user could apply to circumvent the running of these advertisements in their entirety. That is, any user command to alter the rate of play or skip in the forward direction is disabled, along with muting or reducing the sound volume beneath a certain minimum threshold. Initially, each ad and ad block is required, but once an individual ad and its current ad block have played completely through, the logic of the player/viewer may indicate that enforced regular-speed play is no longer necessary for the particular ad or ad block in question. When an ad or ad block is not required, it may be handled in the same way as part of the content, or skipped entirely.

The player/viewer maintains a persistent memory of each ad block and ad in the master list. However, track allowance based ad blocks are assembled extemporaneously by the intersplicer in response to the number of tracks or pages that the user has received, possibly operating in conjunction with some sense of timing based on the clock. Typically, these blocks are new every time, and only certain ads within them may be skipped, if skipping in this instance is to be allowed at all.

In step 710, the intersplicer takes special actions if it detects that a required ad section is starting or ending. At the start of a required ad section, a copy of the current player settings is saved, and the parameters are set to regular speed play at a volume no less than a particular threshold level. Also, if user-interface functionality is to be disabled directly during required ad play, this takes place here. There is logic provided through intersplicer control commands 522 to handle the enforced viewing of ads according to the invention without resorting to disabling controls at the interface level, but the option exists to do so instead or in addition. If user interface controls are not disabled directly, they can check the current ad state of the intersplicer through a special intersplicer command and use this result in their own operations. If step 710 detects the finish of a required ad block, it will restore the player settings that were saved as the required ad block was entered, subject to any intersplicer control commands 522 that may have altered the saved settings.

In step 712, the intersplicer performs any necessary adaptive ad selection. If an unsegmented title or track is currently in progress, the adaptive logic keeps track of the number of tracks played, and the time passed since the last ad ended. Depending on values in the ad selection parameters, the intersplicer will apply some combination of track count-based and elapsed time-based logic (or any other desirable criteria) to decide when to call for a commercial break. When it decides to insert a break, it uses the data in the ad preference parameters 678 and the ad preference tables 676 to select individual ads from the master ad table 670 to put into the block, and orders them in the way that best fits the preference parameters of all the ads in the block.

In step 714, the intersplicer consults the local data it is keeping in memory on ad usage, in conjunction with any special messages it may have received from the adaptive ad selector about having trouble finding ads. If it finds one or more ads and or blocks that have either shown too many times or been held in the list for too long a period of time, it makes a maintenance request for local ad rotation. The intersplicer contacts its ad rotator and sends it a list of ads and ad blocks in any combination, which are to be replaced, or it may request an entire new set of ads to replace all the current ones.

The ad rotator may choose to consult the alternate ad table or run the equivalent of a whole new ad manager session to replace the ads and/or ad blocks requested by the intersplicer. When it has finished it's task, it informs the intersplicer that new ads are ready, and the intersplicer 518 receives the result and swaps the new ads/ad blocks in place of the old ones when it finds an appropriate time, keeping usage data from the old ads to be used later to compute ad penetration.

As the user arbitrarily controls the playback, intersplicer 518 keeps an account of its entire user-directed play history, including which ad blocks have been seen, the number of times each individual ad has run, and the ad selection criteria behind each of these runs. In response to this history, the intersplicer dynamically selects ads from its available pool to group into new blocks and sequences them into the playback at appropriate points. In this way, the ads run are customized to the consumer's actual use of the content.

In step 718, the intersplicer may elect to checkpoint any data it is maintaining about the media and ads that have played in order to compile usage records, and to maintain an in-process snapshot of this information to be recovered in the event of a system failure.

The ability of the player/viewer software to adaptively select, sequence, and re-sequence ads that are shown on the basis of user navigation through a self-selected series of media content is a novel feature for media players, and it is also novel in the field of media distribution, in that software running on a consumer system is presenting same-media style ads that are sequenced on the basis of the user's particular choices of content and playback. Also novel is the on-demand selection of appropriate ads from a greater repository, performed by software running centrally or on a consumer's machine, to custom-select and assemble the ads shown on the basis of the consumer's choice of content, as well as demographic and other consumer information on file.

In step 720, the intersplicer checks to see if any user action or system timeout has requested to close the session, and if not, it loops back to step 708 to continue processing user, player, and ad rotator interactions. In the event a session close has been indicated, control passes to step 722, which signals the playback session to end. This signal causes the real-time player 520 to stop and close itself out, a process in which it closes open files, cleans out its buffers, and ends. Once it has closed real-time player 520, the intersplicer releases ad rotator 516 and cleans up after itself, finishing step 722 and moving on to its end, in step 724.

In step 708, the intersplicer communicates with the real-time player to maintain certain playback parameters, which affect the control of playback. The player/viewer maintains a sense of the currently active intersplicer in the course of managing its GUI frames and panels. When a user takes any action on a graphical object in the play control area of the interface, the user interface 500 calls one or more appropriate intersplicer control command methods 522 belonging to the focused intersplicer.

These intersplicer control methods 522 alter certain player settings in memory, causing the real-time player 520 to alter playback upon discovering the change.

User commands that communicate with the intersplicer in this manner include the common playback controls of play, stop, pause/continue, reverse, rewind, fast-forward, slow-motion, track advance, frame-by-frame advance, go direct to point or page in sequence, and shuttle knob. They also include any sound controls, such as volume and mute, and for print media, the display control operations of forward and backward page turns and chapter advances and returns.

According to the invention, the real-time player 520 deciphers media files as it runs through the logic of secure/release 582, playing or showing content directly to the user through volatile sound and display devices, and managing any needed buffers in the process. Where non-volatile memory or other storage is used for buffering of copyrighted content during the course of playback, provisions available to the computer system to limit access to these areas from outside the program may be employed, and the intersplicer may include in its clean-up tasks the job of explicitly writing over any areas that contain unencrypted content. In addition, the intersplicer may use a rough encryption algorithm on these buffer areas to further hide them from the user.

The intersplicer handles user generated requests to alter the speed of playback or skip around throughout the requested material. It keeps track of all the particular segments of the content and advertisements that have run through its play history, including a count of the number of times for each of them. As any single ad or block of ads is presented multiple times throughout the course of the session, the intersplicer may call for new ads and/or ad blocks as it deems they are needed, and a maintenance process will see to it that the requested ads are replaced. When the user or the player/viewer application signals that the requested session is ready to close, the intersplicer closes out playback and passes its raw data on media use and ad penetration along to step 524, the usage monitor.

Other than the controls to navigate through audio/video playback and print viewing, there are also intersplicer methods to handle user interface manipulation on the part of the user. As multiple requests to play/view 502 are running concurrently, there are actions that close a running request, those that hide an individual play/view presentation, and others that restore the view of a hidden presentation.

FIGS. 8A-8D, 9A-9C, 10A, and 10B are flowcharts to illustrate the operation of the primary intersplicer control commands 522 (FIGS. 5A, 7A). These operations are the essential elements of the user controls listed above, and one of many important novelties of the invention is its ability to ensure the viewing of promotional ad material when the service level calls for it, whether through these controls or by some other approach. As these commands alter the course of play, they are also responsible for gathering user play history data, effectively keeping track of the user's entire navigation history throughout the material, as shown in the following figures. The commands illustrated in these figures are those that pertain to the operation of the intersplicer. The user actions which invoke these commands may involve additional operations not shown, to manage other appearance and behavior aspects of the user interface.

Figure 8B:
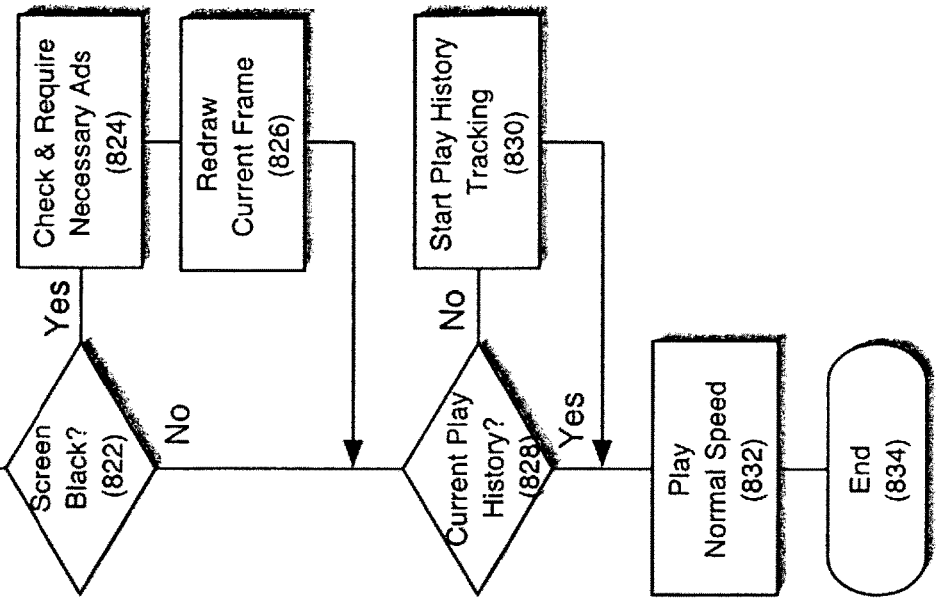
FIGS. 8A-8D are flowchart illustrations of software operation in response to user-generated playback control events, according to one embodiment of the invention.
Figure 8A:
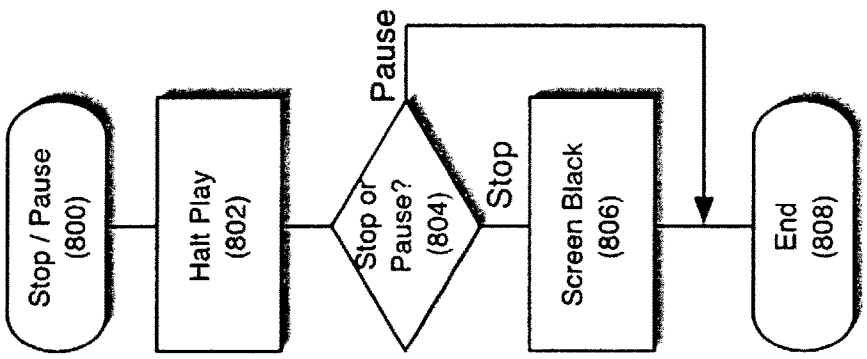

Referring now to FIG. 8A, there is shown a flowchart depicting an intersplicer control command to stop or pause playback, beginning at step 800. In step 802, it issues an intersplicer player setting to signal the player to halt. In step 804, it makes a decision based upon whether the initiating user action is a "stop" or a "pause". In the event of a "stop", step 806 issues a player setting to put up a black screen, rather than to display the current frame. In the event of a "pause", control skips past step 806, directly to the end 808 of the command.

Referring now to FIB. 8B, there is shown a flowchart illustrating the operation of an intersplicer control method to play forward at regular speed, beginning at step 820. The player setting for "current frame" reflects the print page or video frame (for video content or audio content with corresponding visual feedback) at the point in the media sequence being presented, along with any audio sample corresponding to the start of the frame. The current frame changes in response to playback progression and user navigation through the content.

In step 822, the method checks on the condition of the screen to see if it is black. If the screen is not black, control proceeds directly to step 828. Otherwise, control proceeds to step 824. In step 824, the intersplicer checks to see if any ads are immediately necessary as a result of user navigation taken while the screen was black, and waits for the intersplicer to run any such ads in their entirety, before passing control to step 826. In step 826, the method redraws the current frame and passes control to step 828.

In step 828, the method checks if there is a current session play history for the content. If there is no existing play history, step 830 starts play history tracking by marking the current playback point as the start point, before passing control to step 832. Otherwise, there is no need to start a new instance of play history, and control proceeds directly to step 832, which signals the intersplicer to resume play at normal speed. The method ends at step 834.

Figure 8D:
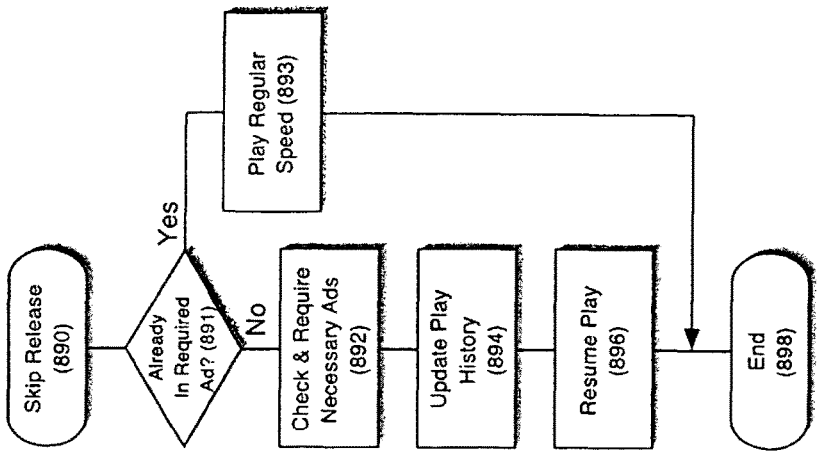
Figure 8C:
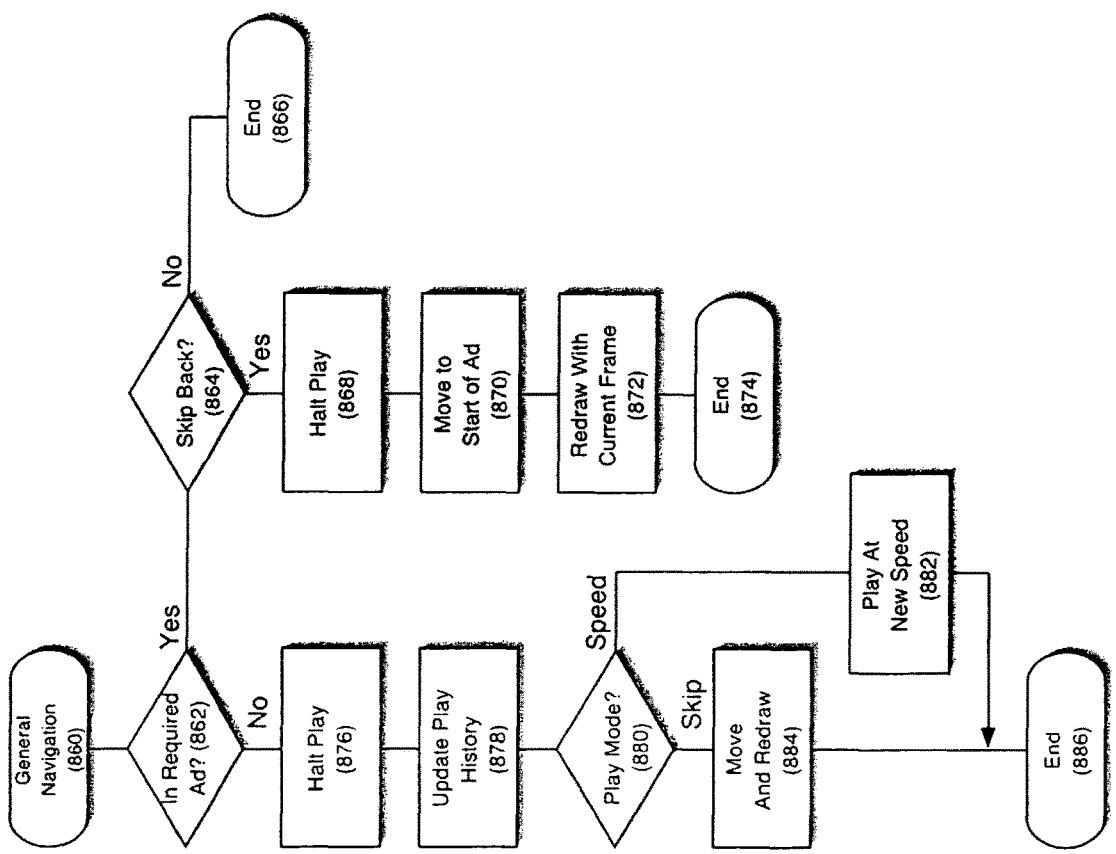

Referring now to FIG. 8C, there is shown a flowchart illustrating the operation of an intersplicer control command method for general navigation throughout the requested content. This includes backing up at a regular, reduced, or accelerated speed, fast-forward play, skipping forward or backward to a fixed point, slow motion or frame advance, and general skipping around by dragging along a time bar.

In step 862, the method checks to see if a required ad is currently in progress. If the answer is yes, step 864 checks to see if the requested operation is a backward skip, and exits the method immediately if it isn't. If it is a backward skip in a commercial segment, control passes to step 868, which halts play, and then to 870, which moves the current frame back to the beginning of the current ad or advertisement block. When a required ad is playing, no skipping prior to this point is permitted. Step 872 redraws the current frame at this point, using the method illustrated in FIG. 8B, and once playback is resumed, the method ends in step 874.

At step 862, if no ad is in progress, or the ad and ad block in progress are already tagged as having been viewed at least once, control proceeds to step 876, which halts playback. Next, step 878 updates the play history currently in progress with the initiated navigation and continues tracking. Step 880 is a decision based on whether the operation that called the method is one to alter the play speed, or to skip around. In the event of a speed alteration, control passes to step 882, signaling the intersplicer to run the player at a new forward or backward speed. In the event of a skip, control passes to step 884, which moves the current play position to a new point and signals the intersplicer to redraw the screen with the frame for the new position. After step 882 or 884, the method ends in step 886. If playback is to resume after a skip action, the action calls the method shown in FIG. 8D at this point. In either case, if the user is dragging along a time bar, playback doesn't resume until the drag is released.

In FIG. 8D, there is shown a flowchart to illustrate the operation of the intersplicer control command to resume play upon release of an interactive skip operation. The command begins in step 890. In step 891, the program checks to see if a required ad is already in progress. If the answer is yes, then control proceeds to step 893, which resumes playback at regular speed, using the method depicted in FIG. 8B. After resuming playback, the method ends in step 898. If the answer is no, then control passes to step 892, where the intersplicer checks to see if any ads are immediately necessary as a result of the user's jump to the new current position, and waits for the intersplicer to run any such ads in their entirety, before passing control to step 894. In step 894, the program updates the play history with the starting point of the new play location. Next, step 896 signals the intersplicer to resume play at the current speed setting, and the command ends in step 898.

Referring now to FIG. 9A, there is shown a flowchart illustrating the operation of an intersplicer control command to close out the media request session. The command begins in step 900. In step 902, it instructs the intersplicer to halt play if it is in progress. In step 904, it checks to see if play history tracking is in progress. If it is, then the command goes to step 906, which ends the current play history and passes control to step 908. If not, control proceeds directly to step 908. In step 908, the command instructs the intersplicer to close out its session the next time it reaches its decision step 720 (FIG. 7A).

Referring now to FIG. 9B, there is shown a flowchart illustrating the operation of an intersplicer control command to hide the view of a running intersplicer's panel or window. The command begins in step 920. In step 922, it instructs the intersplicer to signal its associated real-time player to turn off the redrawing of running media, allowing the player to free up resources as it sees fit. Step 924 ensures that audio content will continue to play if the media is not halted, and it may involve signaling higher level audio control software to mix this audio with that of other active intersplicer sessions. Step 926 indicates to the intersplicer that the player is "hidden", for sake of tracking media use and ad penetration. That is, play history accounting of content or advertising that plays while the intersplicer is hidden will take into account the fact that any visual aspect of the content or ad was hidden at the time. This accounting applies to video and print content or ads, because their visuals are not seen, and to the audio portion of any content or ad in the special case where another session's audio is mixed into the stream while the content or ad is playing. In the case of hiding the panel or window of audio-only content to use some other silent visual media, hidden accounting of content or ad play history may not take effect. Step 928 is the end of the command.

Referring now to FIG. 9C, there is shown a flowchart illustrating the operation of an intersplicer command to restore the view of a hidden intersplicer's panel or window. The command begins in step 940. In step 942, the command prompts the intersplicer to resume display activity through its associated real-time player, giving the player a chance to ready any buffers and other resources it needs to reestablish visible play. Once the player is prepared to proceed, control passes to step 944, which signals the player to resume redraw of visual content. The command ends in step 946.

Figure 10A:
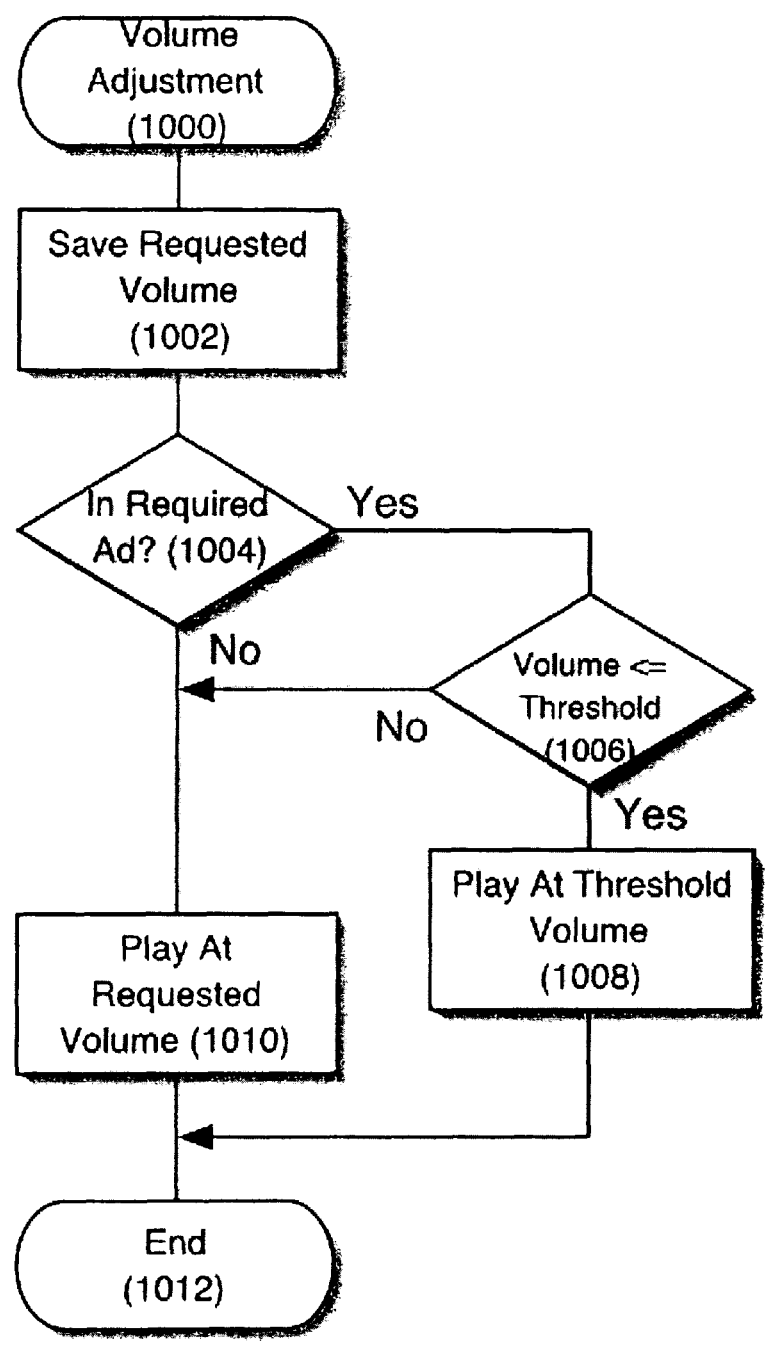
FIG. 10A is a flowchart illustration of software operation in response to user-generated audio-level control events during playback, according to one embodiment of the invention.

Referring now to FIG. 10A, there is shown a flowchart illustrating the operation of an intersplicer command to change or mute the playback volume. According to the invention, volume and mute controls behave as they would in an ordinary media player, except during the presentation of required ads. In that circumstance, the player/viewer has a minimum threshold, and the sound volume is required to be at or above this level.

The method begins in step 1000. In step 1002, the method saves the new volume level value as the volume to be applied after completing required ads. In step 1004, it checks to see if a required ad is currently in progress. If the answer is yes, step 1006 checks the new volume level against the minimum threshold volume for required ads. If the new volume level is at or beneath this level during required ad play, step 1008 signals the player to change the volume to the threshold level. If the requested volume is above the threshold, or if required ads aren't in progress, control proceeds to step 1010, which changes the player volume to the new level. In either case, control proceeds after step 1008 or 1010 to step 1012, the end of the method.

Figure 10B:
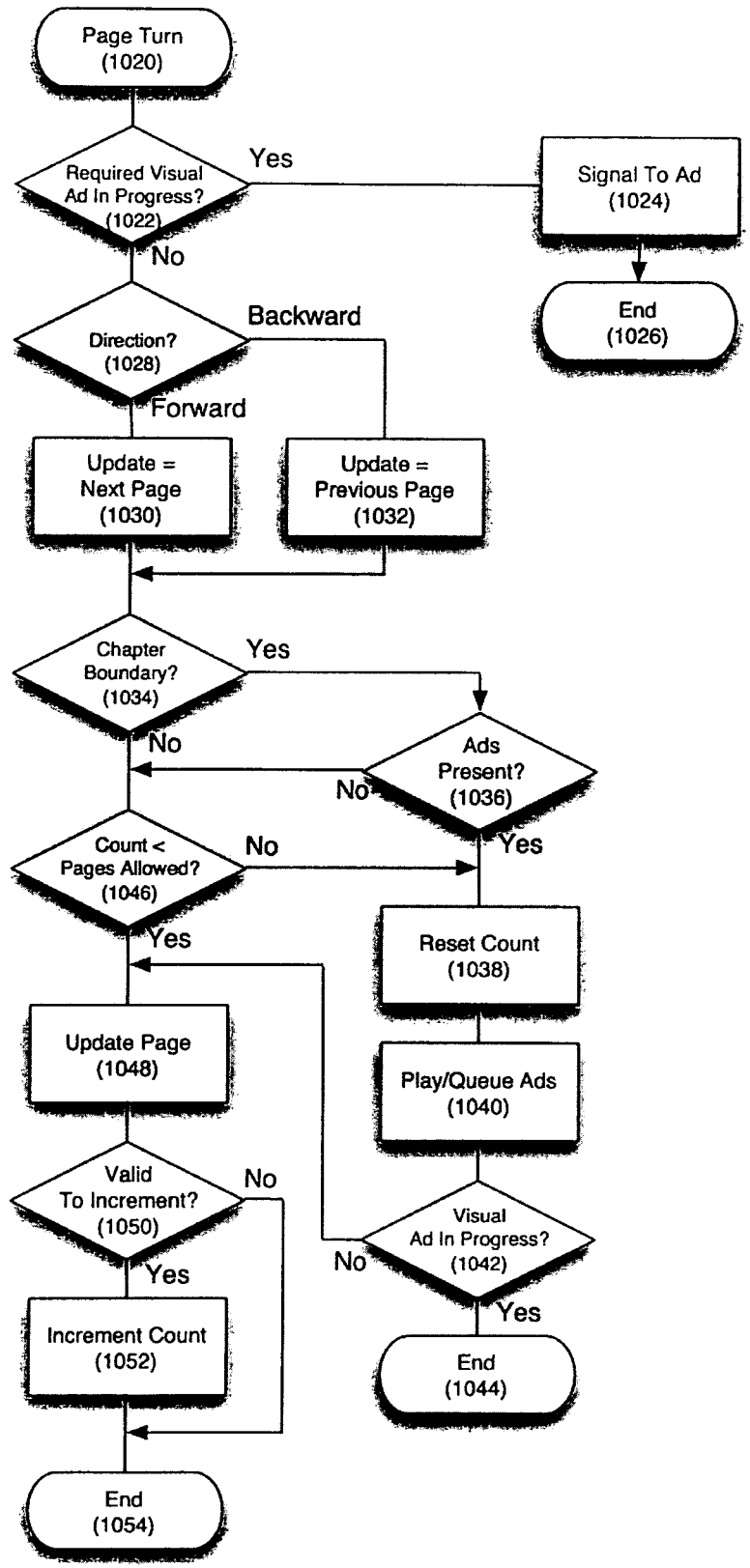
FIG. 10B is a flowchart illustration of software operation in response to user-generated print media viewing control events, according to one embodiment of the invention.

Referring now to FIG. 10B, there is shown a flowchart illustrating the operation of an intersplicer command to turn the page. This command is used in the course of viewing print media, where the user is offered buttons to page forward or page backwards. Print media also offers controls to skip to the beginning or end of the current chapter (which may take any of the same form as book chapters, newspaper sections, magazine features, or other editorial divisions), or to any specific point in the content. For these operations, the method of FIG. 8C is employed, where each page can be thought of as a "frame" in the viewer, and chapters are equivalent to segments for the purpose of determining ad requirements.

However, most user interaction with print media is on a page-by-page (frame-by-frame) basis, and individual page turns may signal the insertion of one or more required ads. The intersplicer command for turning the page begins with step 1020. In step 1022, the method checks to see if a required ad involving any visual content is already in progress. If the answer is yes, control proceeds to step 1024, which signals the forward or backward page turn logic associated with the current ad, after which the method ends in step 1026, thereby prohibiting the user from paging out of a required visual ad while it is in progress. If the particular ad logic is equipped for user-requested page turns within the ad, it will handle the signal from step 1024 accordingly.

If the answer to step 1022 is no, control proceeds to step 1028, which tests whether the page turn is in the forward or backward direction. If the direction is forward, step 1030 sets the update page to be the page after the current page. If it's backward, step 1032 sets the update page to be the page before the current page. Either way, control after that proceeds to step 1034.

Step 1034 is a test to see if the page turn request crosses a chapter boundary in the print media. If the answer is yes, control proceeds to step 1036, which checks to see if any ads are to be shown at the specific chapter boundary in question. If the answer is yes, control proceeds to step 1038, which resets the page counter before passing control to step 1040. Step 1040 runs or queues the appropriate ad or block of ads, and, as with all ads, the intersplicer maintains the means to determine if such ads are required to run in their entirety, or if the user is allowed to skip through them.

Step 1040 typically starts running the new ads immediately. However, if a previous audio-only ad is still in progress at the time, step 1040 queues the new ad segment for play immediately following the completion of the playing ad. If the new ad segment is not required, step 1040 may elect to forego it for sake of user convenience, rather than putting it in the queue. If it queues up any visual advertising material, step 1040 may display a special purpose, single-page silent ad to accompany the audio-only ad that is still in progress, which may be generic in nature or tied to the current ad in some material way.

Once step 1040 has set into motion or queued the new advertising, step 1042 decides whether the currently playing ad has any visual content. If the answer is yes, the method ends at step 1044. Otherwise, control proceeds to step 1048, which updates the displayed page, and then to step 1050, which tests to see if it is valid to increment the page counter. The purpose of this is to allow assorted rules of use to page allowance. One such use would be to increment in all cases, whether the page turn is forward or backward. Alternatively, only forward page turns may increment the counter, or the counter may increment only when turning to a page that hasn't been viewed within the last few minutes. Whichever method is chosen, a test for it is performed in step 1050. If the test passes, control proceeds to step 1052, in which the method increments the counter before ending in step 1054. If it fails, the method goes directly to its end at step 1054.

If the answer to either step 1034 or 1036 is no, control passes to step 1046, which is a decision based on the value of the page counter. If the page count has reached or exceeded the allowance for page turns between ad segments, control goes back to step 1038 and then to 1040, resetting the page counter and calling for ads. Allowance-based ads are typically required when they arise, as opposed to chapter break ads which are generally required just the first time around. It is also generally true that allowance based ads rotate more often than chapter break ads, which maintain some sense of "particular ads at a particular place" in the media time line. In step 1042, the method will decide to end if the currently playing ad is visual in nature. If the ad is audio-only, control proceeds to step 1048, updates the displayed content page, and then to step 1050, which tests to see if the page counter is to be incremented. If the answer is yes, step 1052 increments this count before passing control to step 1054. Otherwise, control passes directly to step 1054, the end of the command.

Whenever a visual ad or block of ads finish, the update page is the page that is viewed next in the paging direction. It is also possible to have blocks of text content and visual ads interspersed on the same "page", much in the same way that content may appear interspersed with advertising on a traditional newspaper page. In this case, the intersplicer treats the assembly of content and advertising as a visual ad, and the ad provides logic to handle all of its associated parts, through the mechanism of step 1024 above, possibly operating in conjunction with user interface event handlers that work directly with the logic of such print ads.

Through the operation described above, the invention behaves as described, providing a novel apparatus that implements the method of a particular business model. That model is the sponsorship of media content, made available to the public for free, through the use of paid commercial interruptions. The use of this business model adds value to the distributor and copyright holder by creating a market for advertising time via the distribution system, and it adds value to the consumer, who gains the ability to request any available desired content on demand and use it for free. The wider the consumer audience that uses and redistributes content to be used in this fashion, the greater the benefit to the distributor and copyright holder.

By implementing this business model, the apparatus and method of the present invention are a new use of digital rights management technologies, one that is a clear improvement over their ordinary practice of either granting or denying use of material altogether. The invention pertains to any digital media distribution or rights management system that employs application software, running on a multitude of consumer devices, to enforce the insertion of ads into the media content presentation stream at time of use as described above, where these ads are selected and their sequence determined by the software on the consumer device. In a particular embodiment with additional functionality, ad selection at the consumer device level is supplemented through ad selection from a central database, either as a means to determine candidate ads, or as a distributor-supplied fill-in for broadcast streams, to provide an option to consumer device level ad sequencing when user specific ads aren't available in time to go with the stream.

Figure 11A:
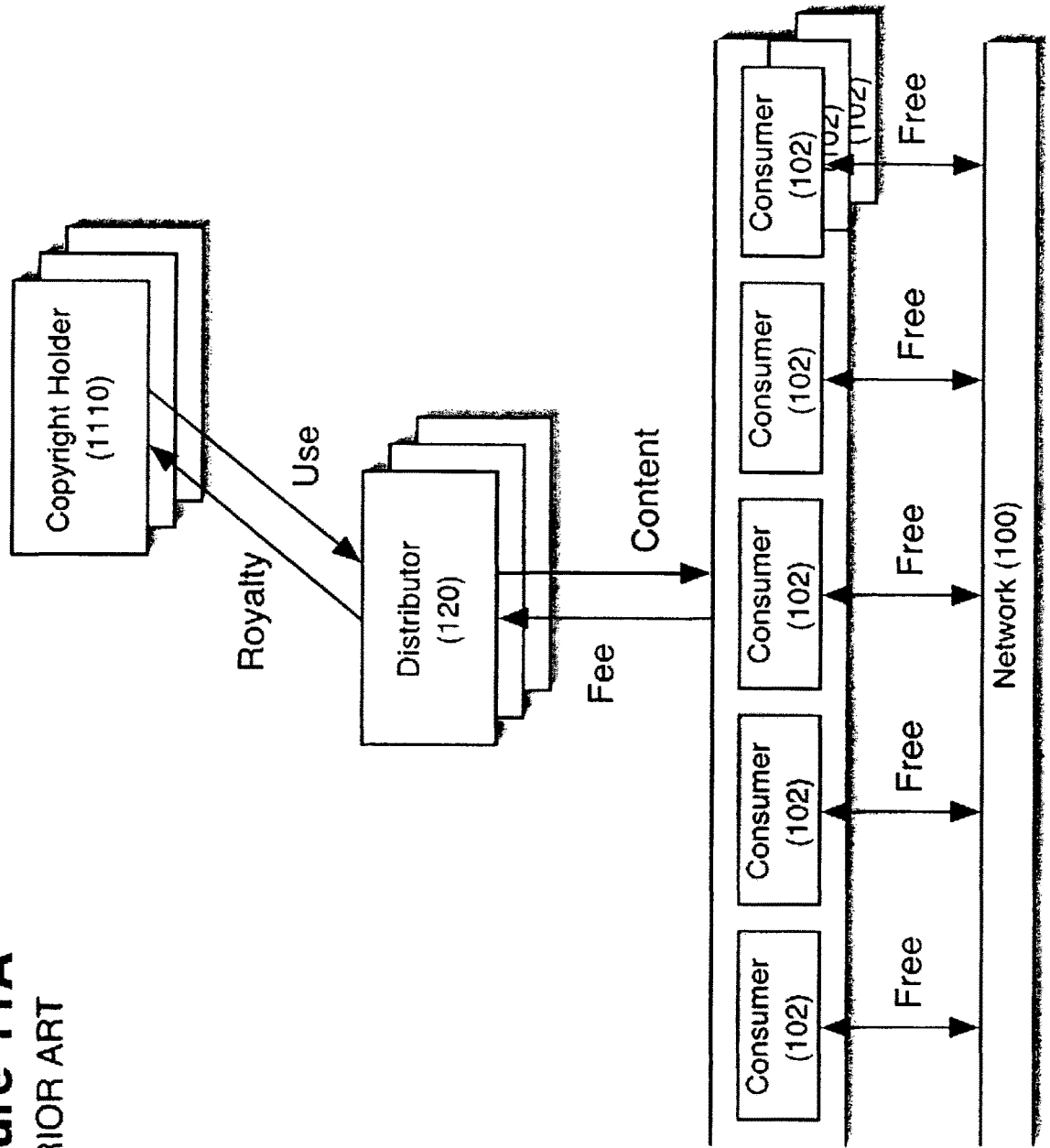
FIGS. 11A-11B are schematic illustrations of prior art business models employed for the purpose of media content distribution.

Referring now to FIG. 11A, there is shown a schematic diagram indicating exchanges between individual consumers 102, the media distributor 120, and one or more copyright-holders 1110, as they commonly occur on digital networks without the method and apparatus of the present invention.

Individual consumers 102 receive media content though direct purchase or ongoing subscription to an online service offered by a distributor 120. Whether this happens by transfer over a digital network 100, or physical conveyance of removable media, the content is transferred directly to a particular consumer in exchange for a one-time charge or regular periodic payment. The distributor 120 has an agreement with the copyright holders 1110 to pay them a certain royalty based on use of their material, and the distributor 120 pays this out of the money received from the consumers 102.

Ordinarily, when individual consumers 102 have the ability to openly copy and redistribute media content over a network 100, this arrangement breaks down. Under this circumstance, certain consumers can get content directly from one or more other consumers, thereby bypassing the legitimate distribution chain and using the media without paying for it.

The distributor 120 may employ existing digital rights management methods to curtail this type of exchange, but only to a certain extent. There is generally some way for an unscrupulous consumer to get around the system and redistribute the media property, even if it means having to go through an intermediate analog or other step. Furthermore, there is a strong market force to support such piracy, because of the economic nature of media content as a good. It is believed that the majority of consumers who refrain from purchasing media content do so more out of pricing concerns than out of lack of interest in the product. This implies that there is a huge market for pirated media content, given the vast number of consumers who would use more media if the price were lowered.

Figure 11B:
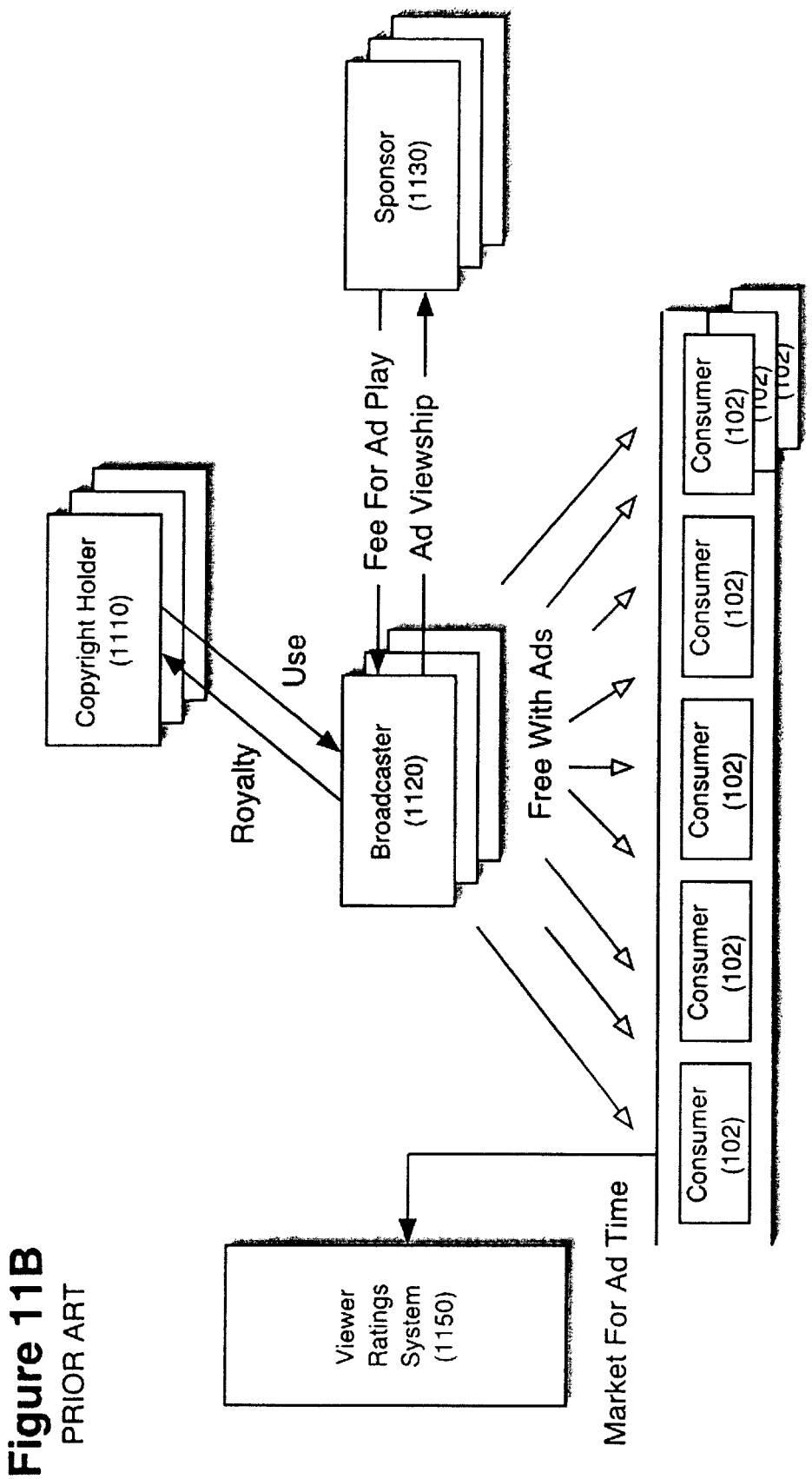

Referring now to FIG. 11B, there is shown a traditional broadcast model for media distribution. A broadcaster 1120 pays to license the use of content material from the copyright holder 1110, and sends it out for free over the airwaves, through cable lines, or through some other means to the widest possible audience of consumers 102. The broadcaster 1120 profits from this practice by inserting paid advertisements into the content stream, which the consumers 102 are ordinarily exposed to along with the content because of the real-time nature of their receiving devices. One or more sponsors 1130 pay the broadcaster to run their ads, in exchange for the audience viewership that these ads receive. A sponsor 1130 makes money from an individual consumer 102 when the consumer purchases the sponsor's product as a result of seeing or hearing an ad for it.

Radio and television broadcasting have conventionally employed such a model, and as the system matured, the value of a viewership ratings system 1150 became apparent. Through statistically based estimates on programming viewership, broadcasters and sponsors get a better sense of the value of their ad time.

This system supports the free distribution of media content to the widest possible audience. The more consumers 102 who are exposed to content sequenced with ads, the greater the value sponsor 1130 and broadcaster 1120 derive from it. If a consumer 102 records broadcast material and redistributes it to other consumers digitally over a network, without removing the ads, there is still value to be had, if only the viewer rating system 1150 had a way of measuring such use and including it into its statistics. Ordinary methods of viewer ratings measurement are not equipped to handle this type of redistribution.

With conventional broadcasting systems, there is little to be gained even if this redistribution were measured, because of the ease with which consumer technology can edit out the paid advertisements from a recorded broadcast. That is, for a consumer who is going through the effort of redistributing broadcast material, it requires very little extra effort to remove the commercials from the content, thereby circumventing the system entirely.

Figure 11C:
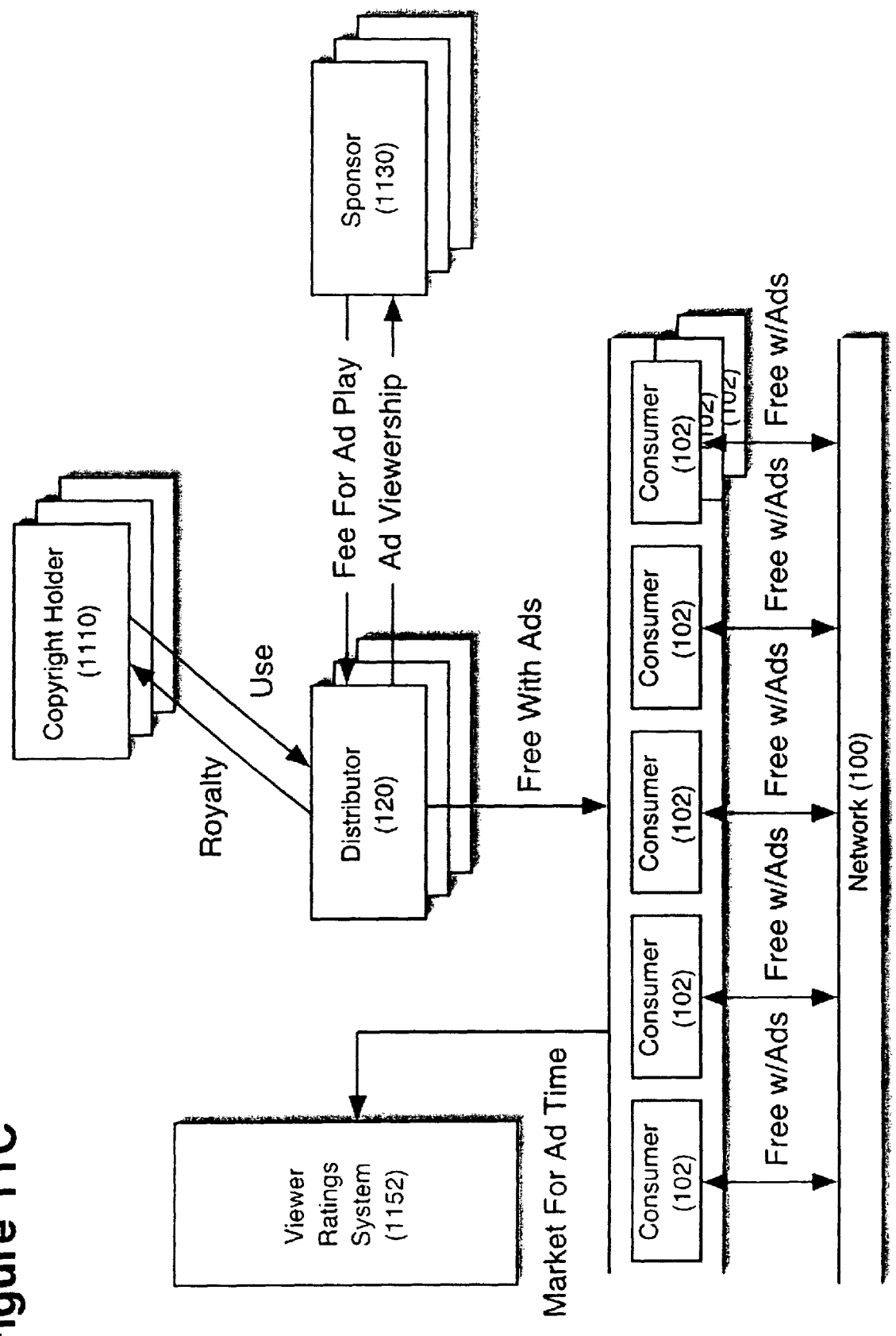
FIG. 11C is a schematic illustration of one particular business model capable of implementation with various methods and apparatus of the invention.

Referring now to FIG. 11C, there is shown a schematic diagram for media distribution according to the invention. In this case, we have a distributor 120 who distributes media to individual consumers 102 by the same direct transfer methods described with FIG. 11A, one method of which is transfer over a digital network 100.

However, by the apparatus of the invention, in particular the player/viewer software which individual consumers use to playback their content, a method is put in place to insert advertisements targeted by user demographic information, device location, user self-selected preferences, or some other criteria, into every media presentation that is produced for a consumer who chooses to use the content for free under a general license. By way of this novel apparatus, the invention creates a new use for the traditional broadcaster's business model, depicted in FIG. 11B.

By virtue of this business model, the value to distributor 120 and copyright holder 1110 of unrestricted consumer redistribution of material is turned from a liability to an asset, and a clear improvement results. Consumer redistribution becomes in effect a means of broadcasting, and the revenue generation value of the distribution system is bolstered by it.

According to the invention, a distributor 120 makes arrangements for the use of content material from the copyright holder 1110, and sends it out for free over a digital network 100 to the widest possible audience of consumers 102. The distributor 120 profits from this practice by inserting paid advertisements into the media presentation, which the consumers 102 are forced to watch and/or listen to along with the content because of the player/viewer software apparatus of the invention. One or more sponsors 1130 pays the distributor 120 to run their ads, in exchange for the audience viewership that these ads receive. A sponsor 1130 makes money from an individual consumer 102 when the consumer purchases the sponsor's product as a result of seeing or hearing an ad for it.

To gauge the audience viewership that these media and ads receive, the player/viewer software includes a unique usage monitor which provides for a more sophisticated viewer ratings system than the ordinary and conventional ratings systems in practice with traditional broadcasting. Principally, the usage monitor forwards media and ad penetration data gathered during media presentation, from every consumer (rather than just from a representative sample), to the viewer ratings system 1152. Additionally, when used in conjunction with information gathered by virtue of the digital rights management practices employed for license verification, these data provide a complete media and ad consumption history for each user.

With usage monitoring, it also becomes feasible for the license verification process to provide "special offers" and other extra benefits in exchange for frequent use. For instance, the distributor might choose to bestow a full purchase license to a media title upon a consumer who has "earned" it by way of many repeated presentations of the same title under the general license with ads. Alternatively, the distributor might choose to grant "reward points" to a consumer, "earned" by way of many repeated presentations of various media under the general license with ads, good toward a full purchase license to a media title of the consumers choosing. A third alternative might involve rewarding a consumer with either a full purchase license to a media title or "reward points" good toward a full purchase license to a media title of the consumers choosing, in exchange for that consumer making other consumers on the system aware of new media, either directly or indirectly, which results in additional revenue which can be attributed to the efforts of the original consumer.

This method and apparatus result from the incorporation of well-established mass-media broadcasting practices, along with existing and new computer-controlled digital data management, manipulation, and encryption techniques, into a novel, software based digital media presentation apparatus. By coupling the long-standing broadcast media practice of commercial advertisement sponsorship with the appeal of select-on-demand, consumer-level redistribution, it is a great improvement over current digital media distribution practices. The consumer retains the conveniences of virtually unlimited free media selection, instant access, and unrestricted sharing, while gaining the legitimate right to have them. The copyright owner gains a tangible value from the increased viewership resulting from unlimited consumer-level redistribution of content onto digital devices, and explicit control over media use. The ability of media content consumers 102 and copyright owners 1130 to mutually benefit from digital distribution over a network 100 is vastly improved.

Without departing from the spirit and scope of this invention, one of ordinary skill in the art can make various changes and modifications to the invention to adapt it to various usages and conditions. For example, while in the embodiments described herein the invention is implemented primarily in software, it should be understood that the invention may be implemented with hardware, software, firmware, or any combination thereof. As another example, ad selection can be based on other useful criteria including, but not limited to, time of day, the format of the associated media file, and marketing preferences (e.g., user preferences, distributor preferences, advertiser preferences, content provider preferences, etc.). Further, the invention can be embodied in an electronically-readable medium having code embodied therein for causing an electronic device to perform the methods described herein.

We claim:

1. A digital media player device for controlling digital media presentations, the digital media player device comprising:
   one or more processors for receiving data comprising digital media content and digital advertising content;
   a user interface input for allowing a user to control a course of presentation of the digital media content received;
   an intersplicer for controlling one or more insertion points of the digital advertising content into the digital media content thereby sequencing the digital media content and the digital advertising content,
      the sequencing comprising ordering one or more data blocks of the digital media content and one or more data blocks of the digital advertising content into a content stream playable as audio or visual content perceivable by the user,
      the content stream comprising one or more initially sequenced insertion points at which the digital advertising content is scheduled to be presented relative to the digital media content during play;
      in response to user input updating a current play position in the content stream to a new play position in the content stream, the one or more processors using one or more adaptive preference rules to adaptively modify a presentation position of the digital advertising content from at least one of the one or more initially sequenced insertion points to one or more alternatively sequenced insertion points in the digital media content,
      at least one of the one or more alternatively sequenced insertion points being different than the one or more initially sequenced insertion points relative to the digital media content within the content stream;
      the one or more alternatively sequenced insertion points being adaptively selectable by the intersplicer according to selection criteria defined by the one or more adaptive preference rules taking into account the new play position and at least one of a length of time associated with playing the digital media content and a number of digital media data blocks of the digital media content to be played,
      such that at least one of the alternatively sequenced insertion points is positioned at a play position in the digital media content that satisfies a condition selected from:
         the play position being a predetermined length of time after the new play position,
         the play position being a predetermined number of digital media data blocks after the new play position; and
   a user interface output for causing presentation of the content stream during a play period associated with one or more states of play such that a part of the digital advertising content is adaptively played at the one or more alternatively sequenced insertion points, instead of at the one or more initially sequenced insertion points; and
   at least a first memory for storing a setting to indicate a first state of play, the setting including a first value to indicate presentation of a required part of the digital advertising content is in progress during presentation of the content stream such that responsive to detecting the first value in the first memory, the user interface input is disabled to prevent commands comprising at least one of a user volume control or a user navigation control from altering a course of presentation of the content stream while presentation of the required part of the digital advertising content is in progress.

2. The digital media player device as in claim 1, wherein the user interface input comprises a graphical user interface that includes a time bar to allow the user to control the course of presentation of the digital media content received to a specific point in the presentation past at least one of the one or more initially sequenced insertion points.

3. The digital media player device as in claim 1, wherein the sequencing is performed by at least one remote system differing from the digital media player device, the at least one remote system comprising a processor.

4. The digital media player device as in claim 1, wherein the digital media content comprises at least one media file.

5. The digital media player device as in claim 1, wherein the digital advertising content comprises at least one advertisement file.

6. The digital media player device as in claim 5, wherein a sequence is generated by sub-dividing a media file into two or more segments, and wherein at least a part of the at least one of the advertising file is presented between two of the segments.

7. The digital media player device as in claim 4, wherein the user input results in a change of a sequence of two or more media files by at least one of subtracting an existing media file and re-arranging the sequence of two or more media files in a change of sequence by adding a new media file.

8. The digital media player device as in claim 1, wherein the user input further comprises one or more navigational choices for the content stream.

9. The digital media player device as in claim 8, wherein the one or more navigational choices are selected from a group consisting of: play, stop, pause/continue, reverse, rewind, fast-forward, slow-motion, track advance, frame-by-frame advance, go direct to point or page in sequence, advance chapter, page turn, change track, change media selection, shuttle knob, and one or more sound controls.

10. The digital media player device as in claim 1, further comprising: rotating, using an ad manager and an ad rotator, new advertising content into the content stream in response to the user input, the ad manager operative to receive ad files and select ad files for presentation from a database of ad files and the ad rotator configured to replace ad files with new ad files after the ad files have been presented.

11. The digital media player device as in claim 1, wherein the adaptively modifying uses two or more of the adaptive preference rules for determining the one or more alternatively sequenced insertion points of at least a part of the digital advertising content.

12. The device as in claim 1, wherein the intersplicer generates control signals configured to instruct the one or more processors to interrupt the presentation of the digital media content with the presentation of the one or more data blocks at the one or more alternatively sequenced insertion points on the digital media player device.

13. The device as in claim 1, the digital media player device further comprising a media file decryptor configured to receive and decrypt the digital media content during play, the media file decryptor configured to limit access to a non-volatile memory following the decryption of the digital media content.

14. The device as in claim 1, wherein the digital media player device is configured to read a data structure of the one or more data blocks of the digital media content, the data structure including a first field containing data identifying a media file associated with the digital media content, a second field containing data indicative of an ad requirement associated with the digital media content, and a third field containing data representing an ad file associated with the digital advertising content to be displayed with the media file.

15. The device as in claim 1, wherein the user interface input includes a time bar configured to control the intersplicer to alter a course of presentation of the content stream in response to the user dragging the time bar, the dragging of the time bar enabling at least one of fast-forward play, skipping forward, backward skipping to a fixed point, slow motion play, and frame advance play.

16. The device as in claim 1, wherein the user interface input includes a graphical user interface comprising a first tab indicative of a first media type and a second tab indicative of a second media type such that a user selection of the first tab causes the digital media player device to present a media file of the first media type in an active display window with a time bar, the time bar configured to control the intersplicer to alter a course of presentation of the content stream in response to the user dragging the time bar, and a user selection of the second tab causes the digital media player device to present another media file of the second media type in a background window.

17. A computer-implemented system for controlling digital media presentations, the system comprising:
one or more processors;
a user interface for allowing a user to control a course of presentation of digital media content;
an intersplicer for controlling one or more insertion points of digital advertising content into the digital media content thereby sequencing the digital media content and digital advertising content,
the sequencing comprising ordering one or more data blocks of the digital media content and one or more data blocks of the digital advertising content into a content stream playable as audio or visual content perceivable by the user,
the content stream comprising one or more initially sequenced insertion points at which the digital advertising content is scheduled to be presented relative to the digital media content during play;
in response to user input updating a current play position in the content stream to a new play position in the content stream, the one or more processors using one or more adaptive preference rules to adaptively modify, a presentation position of the digital advertising content from at least one of the one or more initially sequenced insertion points to one or more alternatively sequenced insertion points;
the one or more alternatively sequenced insertion points being adaptively selectable by the intersplicer according to selection criteria defined by the one or more adaptive preference rules taking into account the new play position and at least one of a length of time associated with playing the digital media content, a number of digital media data blocks of the digital media content to be played, and a point in time the digital media content is to be played, such that at least one of the alternatively sequenced insertion points is positioned at a play position in the digital media content that satisfies a condition selected from:
the play position being a predetermined length of time after the new play position, the play position being a predetermined number of digital media data blocks after the new play position, and the play position being at a predetermined time of the hour after the new play position;

a user interface output for causing presentation of the content stream during a play period associated with one or more states of play such that a part of the digital advertising content is adaptively played at the one or more alternatively sequenced insertion points, instead of the one or more initially sequenced insertion points; and at least a first memory for storing a setting to indicate a first state of play, the setting including a first value to indicate presentation of a required part of the digital advertising content is in progress during presentation of the content stream such that responsive to detecting the first value in the first memory, the user interface is disabled to prevent commands comprising a user navigation control from altering a course of presentation of the content stream.

18. The system as in claim 17, wherein the at least first memory is part of the computer-implemented system.

19. The system as in claim 17, wherein the at least first memory is part of at least one remote system.

20. The system as in claim 17, wherein the at least first memory is part of at least one remote system.

21. A computer-implemented method for controlling digital media presentations using an improved digital media player system, the method comprising:

receiving, on a digital media player system, data comprising digital media content and digital advertising content, the digital media player system having a user interface and an intersplicer, the user interface configured to allow a user to control a course of presentation of the digital media content received, and the intersplicer configured to control one or more initially sequenced insertion points of the digital advertising content into the digital media content;

sequencing the digital media content, using the intersplicer, the sequencing comprising ordering one or more data blocks of the digital media content into a content stream playable as audio or visual content perceivable by the user, the content stream comprising a media section that comprises at least some of the digital media content, the content stream further comprising an advertising block within which at least some of the digital advertising content is scheduled to be presented, the advertising block being arranged within the content stream at an initially defined insertion position relative to the media section during play;

adaptively re-sequencing the content stream into a modified content stream to reflect a user input comprising updating a current play position to a new play position in the digital media content detected at the digital media player system, the modified content stream comprising an alternate insertion position of the advertising block relative to the media section, the adaptively re-sequencing comprising determining the alternate insertion position using one or more adaptive preference placement rules associated with the digital media content;

the alternate insertion position being adaptively selectable by the intersplicer according to selection criteria defined by the one or more adaptive preference placement rules taking into account the new play position and at least one of a length of time associated with playing the digital media content, a number of digital media data blocks of the digital media content to be played, and a point in time the digital media content is to be played, such that the alternate insertion position is positioned at a play position in the digital media content that satisfies a condition selected from:

the play position being a predetermined length of time after the new play position, the play position being a predetermined number of digital media data blocks after the new play position, and the play position being at a predetermined time of the hour after the new play position;

causing presentation of the modified content stream at the digital media player system during a play period associated with one or more states of play;

causing adaptive presentation of a required part of the digital advertising content at the alternate insertion position, instead of at the one or more initially sequenced insertion points;

keeping a setting, in at least a first memory of the digital media player system, to indicate a first state of play, the setting including a first value to indicate presentation of the required part of the digital advertising content is in progress during presentation of the modified content stream; and responsive to detecting the first value in the first memory, disabling user interface commands comprising a user navigation control that enables the user to alter a course of presentation of the modified content stream.

22. A computer-implemented method for controlling digital media presentations using an improved digital media player system, the method comprising:

transmitting, by at least one remote system to a digital media player system, data comprising digital media content and digital advertising content, the digital media player system having a user interface and an intersplicer, the user interface configured to allow a user to control a course of presentation of the digital media content received, and the intersplicer for controlling one or more insertion points of the digital advertising content into the digital media content;

sequencing the digital media content, using the intersplicer, the sequencing comprising ordering one or more data blocks of the digital media content into a content stream playable as audio or visual content perceivable by the user, the content stream comprising a media section that comprises at least some of the digital media content, the content stream further comprising an advertising block within which at least some of the digital advertising content is scheduled to be presented during play, the advertising block being arranged within the content stream at an initially defined insertion position relative to the media section;

adaptively re-sequencing the content stream into a modified content stream to reflect a user input comprising updating a current play position to a new play position in the digital media content detected at the digital media player system, the modified content stream comprising an alternate insertion position of the advertising block relative to the media section, the adaptively re-sequencing comprising determining the alternate insertion position using one or more adaptive preference placement rules associated with the digital media content during play;

the alternate insertion position being adaptively selectable by the intersplicer according to selection criteria defined by the one or more adaptive preference placement rules taking into account the new play position and at least one of a length of time associated with playing the digital media content, a number of digital media data blocks of the digital media content to be played, and a point in time the digital media content is to be played such that the alternate insertion position is positioned at a play position in the digital media content that satisfies a condition selected from:

the play position being a predetermined length of time after the new play position, the play position being a predetermined number of digital media data blocks after the new play position, and the play position being at a predetermined time of the hour after the new play position;

causing presentation of the modified content stream at the digital media player system during a play period associated with one or more states of play;

causing adaptive presentation of a required part of the digital advertising content at the alternate insertion point, instead of the initially defined insertion position;

keeping a setting, in at least a first memory of the digital media player system, to indicate a first state of play, the setting including a first value to indicate presentation of the required part of the digital advertising content is in progress during presentation of the modified content stream; and responsive to detecting the first value in the first memory, disabling user interface commands comprising a user navigation control that enables the user to alter a course of presentation of the content stream.

23. The method as in claim 22, wherein presentation data comprising an indication of the digital advertising content that has been presented is stored in a second memory of the digital media player system.

* * * * *

UNITED STATES PATENT AND TRADEMARK OFFICE
CERTIFICATE OF CORRECTION

PATENT NO. : 10,986,403 B2
APPLICATION NO. : 10/606729
DATED : April 20, 2021
INVENTOR(S) : Donian et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1881 days.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*